US012750122B2

(12) United States Patent
Yoshida et al.

(10) Patent No.: US 12,750,122 B2
(45) Date of Patent: Sep. 29, 2026

(54) COMMUNICATION TERMINAL, BASE STATION, AND COMMUNICATION CONTROL METHOD

(71) Applicant: NEC Corporation, Tokyo (JP)

(72) Inventors: Kohei Yoshida, Tokyo (JP); Masakazu Ono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 57 days.

(21) Appl. No.: 18/792,882

(22) Filed: Aug. 2, 2024

(65) Prior Publication Data

US 2025/0055553 A1 Feb. 13, 2025

(30) Foreign Application Priority Data

Aug. 9, 2023 (JP) ................................ 2023-130491

(51) Int. Cl.
*H04B 7/08* (2006.01)
*H04B 17/391* (2015.01)
*H04W 24/10* (2009.01)

(52) U.S. Cl.
CPC ......... *H04B 7/0834* (2013.01); *H04B 17/391* (2015.01); *H04W 24/10* (2013.01)

(58) Field of Classification Search
CPC .... H04B 7/0834; H04B 17/391; H04W 24/10
USPC ................................................. 375/262, 299
See application file for complete search history.

(56) References Cited

U.S. PATENT DOCUMENTS 10,939,351 B2 * 3/2021 Xu ........................ H01Q 3/247
11,218,212 B1 * 1/2022 Mun .................... H04W 72/51
2002/0039912 A1 * 4/2002 Yamaguchi .......... H01Q 3/2605 455/562.1
2015/0029056 A1 * 1/2015 Yanagidate .............. H01Q 3/34 342/367
2016/0285163 A1 * 9/2016 Clevorn ............... H01Q 3/2605
2016/0323757 A1 * 11/2016 Braun .................... H04B 7/088
2018/0248610 A1 * 8/2018 Faerber .................. H04B 7/086
2018/0254808 A1 * 9/2018 Kobayashi ........... H04B 7/0695
2021/0149011 A1 * 5/2021 Wetzker ................ G01S 5/0252
2021/0360600 A1 * 11/2021 Chendamarai Kannan ................ H04B 7/0408
2023/0025445 A1 * 1/2023 Agarwal .............. H04B 17/318
2023/0276255 A1 * 8/2023 Iwabuchi ................. H01Q 3/46 342/367
2024/0080119 A1 * 3/2024 Uchida ................ H04W 24/04

FOREIGN PATENT DOCUMENTS

JP 2003-188886 A 7/2003
JP 2003-318793 A 11/2003
JP 2004-179693 A 6/2004
JP 2005-086781 A 3/2005

* cited by examiner

*Primary Examiner* — Emmanuel Bayard

(57) ABSTRACT

A communication terminal includes an antenna section and a processor, the processor carrying out: an information acquisition process of acquiring information indicating a location of a base station from the base station by controlling directivity of the antenna section to be a first directivity; and a communication control process of carrying out communication with the base station by controlling the directivity to be a second directivity which is narrower than the first directivity, in the communication control process, the processor deciding the second directivity on the basis of (i) relative locations of the base station and the communication terminal and (ii) a moving speed of the communication terminal.

11 Claims, 15 Drawing Sheets

COMMUNICATION TERMINAL, BASE STATION, AND COMMUNICATION CONTROL METHOD

This Nonprovisional application claims priority under 35 U.S.C. § 119 on Patent Application No. 2023-130491 filed in Japan on Aug. 9, 2023, the entire contents of which are hereby incorporated by reference.

TECHNICAL FIELD

The present disclosure relates to a communication terminal, a base station, and a communication control method.

BACKGROUND ART

A technique is known in which a terminal including an antenna whose directivity is controllable carries out communication with a base station while changing the directivity.

For example, Patent Literature 1 discloses a wireless communication apparatus that gradually narrows an antenna directivity from a broad range to narrow down a wireless communication terminal which can respond.

CITATION LIST

Patent Literature

[Patent Literature 1]
Japanese Patent Application Publication Tokukai No. 2003-188886

SUMMARY OF INVENTION

Technical Problem

The wireless communication apparatus disclosed in Patent Literature 1 gradually narrows the antenna directivity. Therefore, in the wireless communication apparatus, after communication with the wireless communication terminal is established, it takes time to set an antenna directivity with high communication speed without disconnecting the communication with the wireless communication terminal. That is, the wireless communication apparatus has a problem in which it takes time to set an antenna directivity of a communication terminal to be suitable for communication.

The present disclosure is accomplished in view of the above problem, and an example object thereof is to provide a technique of shortening a time taken to set an antenna directivity of a communication terminal to be suitable for communication.

Solution to Problem

A communication terminal in accordance with an example aspect of the present disclosure includes an antenna section whose directivity is controllable and at least one processor, the at least one processor carrying out: an information acquisition process of acquiring information indicating a location of a base station from the base station via the antenna section by controlling the directivity of the antenna section to be a first directivity; and a communication control process of carrying out communication with the base station via the antenna section by controlling the directivity of the antenna section to be a second directivity which is narrower than the first directivity, in the communication control process, the at least one processor deciding the second directivity on the basis of (i) relative locations of the base station and the communication terminal based on the information and (ii) a moving speed of the communication terminal.

A base station in accordance with an example aspect of the present disclosure includes at least one processor, the at least one processor carrying out: an information acquisition process of acquiring information from a communication terminal that includes an antenna section whose directivity is controllable, the information indicating a first directivity of the antenna section, a location of the communication terminal, and a moving speed of the communication terminal in a case where the communication terminal is communicating with the base station; and an instruction process of instructing the communication terminal to carry out communication with the base station via the antenna section by controlling the directivity of the antenna section to be a second directivity which is narrower than the first directivity, in the instruction process, the at least one processor deciding the second directivity on the basis of (i) relative locations of the base station and the communication terminal based on the information and (ii) the moving speed of the communication terminal.

A communication control method in accordance with an example aspect of the present disclosure includes: acquiring, by a communication terminal including an antenna section whose directivity is controllable, information indicating a location of a base station from the base station via the antenna section by controlling the directivity of the antenna section to be a first directivity; and carrying out, by the communication terminal, communication with the base station via the antenna section by controlling the directivity of the antenna section to be a second directivity which is narrower than the first directivity, in the carrying out communication, the second directivity being decided on the basis of (i) relative locations of the base station and the communication terminal based on the information and (ii) a moving speed of the communication terminal.

Advantageous Effects of Invention

According to an example aspect of the present disclosure, it is possible to bring about an example advantage of shortening a time taken to set an antenna directivity of a communication terminal to be suitable for communication.

EXAMPLE EMBODIMENTS

Figure 1:
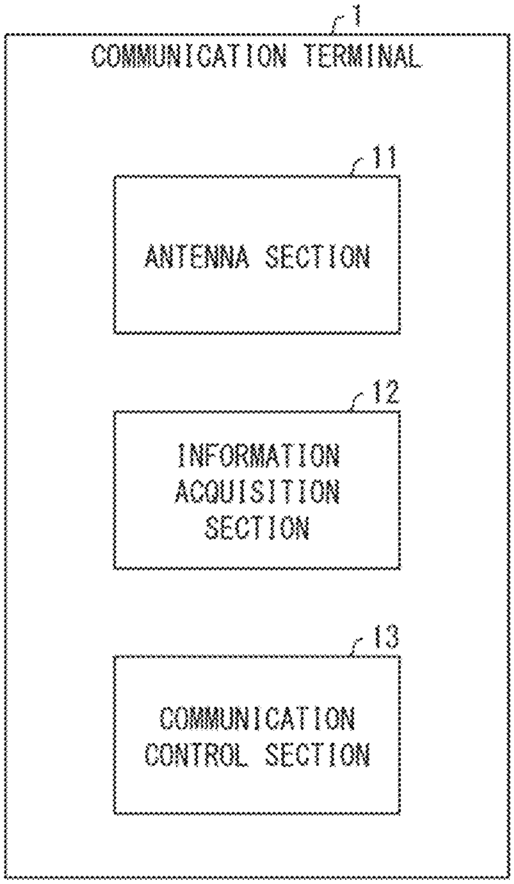
FIG. 1 is a block diagram illustrating a configuration of a communication terminal in accordance with the present disclosure.

The following description will discuss example embodiments of the present invention. The present invention is not limited to the example embodiments below, but may be altered in various ways by a skilled person within the scope of the claims. For example, the present invention can also encompass, in its scope, any example embodiment derived by appropriately combining technical means employed in the example embodiments described below. Alternatively, the present invention also encompasses, in its scope, any example embodiment derived by appropriately omitting part of technical means employed in the example embodiments described below. The example advantages described in each of the example embodiments below are example advantages expected in that example embodiment, and do not define an extension of the present invention. That is, the present invention also encompasses, in its scope, any example embodiment that does not bring about the example advantages described in the example embodiments below.

First Example Embodiment

The following description will discuss a first example embodiment, which is an example of an embodiment of the present invention, in detail, with reference to the drawings. The present example embodiment is a basic form of example embodiments described later. Note that an application scope of technical means which are employed in the present example embodiment is not limited to the present example embodiment. That is, technical means employed in the present example embodiment can be employed also in the other example embodiments included in the present disclosure, within a range in which no particular technical problem occurs. Moreover, technical means indicated in the drawings referred to for describing the present example embodiment can be employed also in the other example embodiments included in the present disclosure, within a range in which no particular technical problem occurs.

(Configuration of Communication Terminal 1)

The following description will discuss a configuration of a communication terminal 1, with reference to FIG. 1. FIG. 1 is a block diagram illustrating the configuration of the communication terminal 1. As illustrated in FIG. 1, the communication terminal 1 includes an antenna section 11, an information acquisition section 12, and a communication control section 13. In the present example embodiment, the information acquisition section 12 and the communication control section 13 are components for implementing the information acquisition means and the communication control means, respectively.

The antenna section 11 includes one or more antennas, and is configured so that directivity thereof is controllable. For example, the antenna section 11 is a multi-element antenna.

The information acquisition section 12 controls the directivity of the antenna section 11 to be a first directivity, and acquires information indicating a location of a base station from the base station via the antenna section 11. The first directivity is not limited and can be, for example, a broadest directivity among directivities with which communication with the base station can be established.

The communication control section 13 controls the directivity of the antenna section 11 to be a second directivity which is narrower than the first directivity, and carries out communication with the base station via the antenna section 11. Specifically, the communication control section 13 decides the second directivity on the basis of (i) relative locations of the base station and the communication terminal 1 based on the information acquired by the information acquisition section 12 and (ii) a moving speed of the communication terminal 1. For example, the communication control section 13 may decide a principal direction of the second directivity to be a direction from the communication terminal 1 to the base station corresponding to the above described relative locations. The communication control section 13 may decide a width (e.g., beam half-width) of the second directivity to be an acceptable narrowest directivity among directivities which are narrower than the first directivity and with which communication with the base station can be established while taking into consideration the moving speed of the communication terminal 1. For example, as the moving speed of the communication terminal 1 decreases, the second directivity can be made narrower.

(Example Advantage of Communication Terminal 1)

As described above, the communication terminal 1 employs the configuration of including: the antenna section 11 whose directivity is controllable; the information acquisition section 12 for acquiring information indicating a location of a base station from the base station via the antenna section 11 by controlling the directivity of the antenna section 11 to be a first directivity; and the communication control section 13 for carrying out communication with the base station via the antenna section 11 by controlling the directivity of the antenna section 11 to be a second directivity which is narrower than the first directivity. Moreover, the communication control section 13 decides the second directivity on the basis of (i) relative locations of the base station and the communication terminal 1 based on the information acquired by the information acquisition section 12 and (ii) a moving speed of the communication terminal. Therefore, the communication terminal 1 can bring about an example advantage of shortening a time taken to set an antenna directivity to be suitable for communication.

(Flow of Communication Control Method S1)

Figure 2:
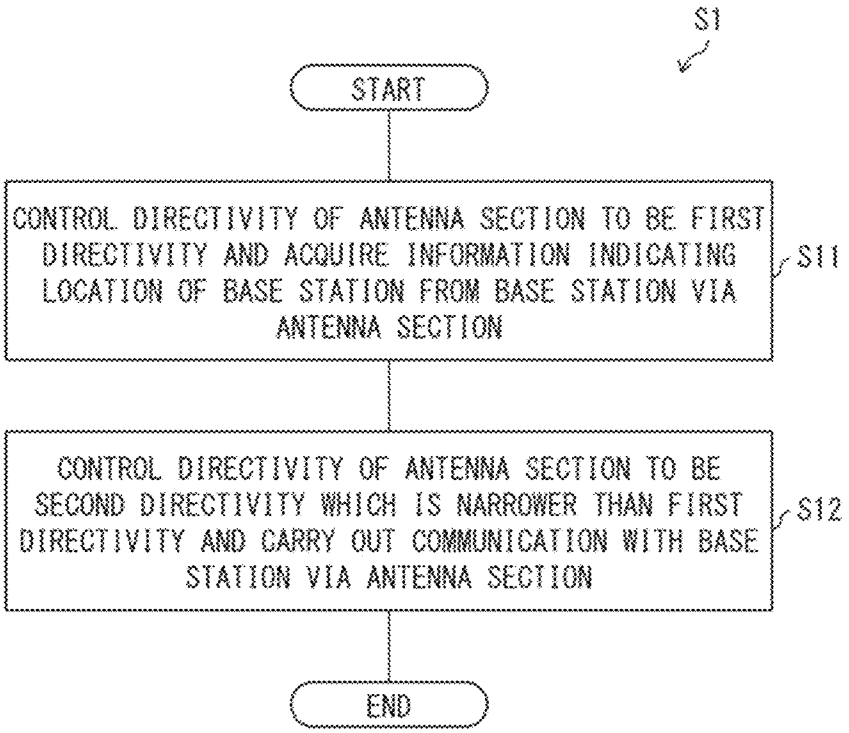
FIG. 2 is a flowchart illustrating a flow of a communication control method in accordance with the present disclosure.

The following description will discuss a flow of a communication control method S1 which is carried out by the communication terminal 1 including the antenna section 11 whose directivity is controllable, with reference to FIG. 2. FIG. 2 is a flowchart illustrating the flow of the communication control method S1. As illustrated in FIG. 2, the communication control method S1 includes an information acquisition process S11 and a communication control process S12.

(Information Acquisition Process S11)

In the information acquisition process S11, the information acquisition section 12 controls the directivity of the antenna section 11 to be a first directivity, and acquires information indicating a location of a base station from the base station via the antenna section 11.

(Communication Control Process S12)

In the communication control process S12, the communication control section 13 controls the directivity of the antenna section 11 to be a second directivity which is narrower than the first directivity and carries out communication with the base station via the antenna section 11. Specifically, in step S12, the communication control section 13 decides the second directivity on the basis of (i) relative locations of the base station and the communication terminal 1 based on the information acquired by the information acquisition section 12 and (ii) a moving speed of the communication terminal.

(Example Advantage of Communication Control Method S1)

As described above, the communication control method S1 carried out by the communication terminal 1 including the antenna section 11 whose directivity is controllable employs the configuration of including: the information acquisition process S11 of acquiring, by the information acquisition section 12, information indicating a location of a base station from the base station via the antenna section 11 by controlling the directivity of the antenna section 11 to be a first directivity; and the communication control process S12 of carrying out, by the communication control section 13, communication with the base station via the antenna section 11 by controlling the directivity of the antenna section 11 to be a second directivity which is narrower than the first directivity. Moreover, in the communication control process S12, the communication control section 13 decides the second directivity on the basis of (i) relative locations of the base station and the communication terminal 1 based on the information acquired by the information acquisition section 12 and (ii) a moving speed of the communication terminal. Therefore, according to the communication control method S1, an example advantage similar to that of the foregoing communication terminal 1 is brought about.

(Configuration of Base Station 2)

Figure 3:
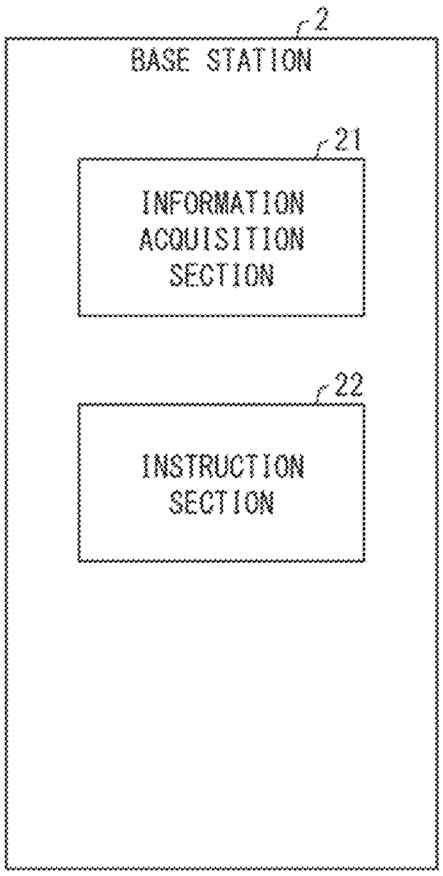
FIG. 3 is a block diagram illustrating configuration of a base station in accordance with the present disclosure.

The following description will discuss a configuration of a base station 2, with reference to FIG. 3. FIG. 3 is a block diagram illustrating the configuration of the base station 2. As illustrated in FIG. 3, the base station 2 includes an information acquisition section 21 and an instruction section 22. In the present example embodiment, the information acquisition section 21 and the instruction section 22 are components for implementing the information acquisition means and the instruction means, respectively.

The information acquisition section 21 acquires, from a communication terminal including an antenna section whose directivity is controllable, information indicating a first directivity of the antenna section, a location of the communication terminal, and a moving speed of the communication terminal in a case where the communication terminal is communicating with the base station 2.

The instruction section 22 instructs the communication terminal to carry out communication with the base station 2 via the antenna section by controlling the directivity of the antenna section of the communication terminal to be a second directivity which is narrower than the first directivity. Specifically, the instruction section 22 decides the second directivity on the basis of (i) relative locations of the base station 2 and the communication terminal based on the information acquired by the information acquisition section 21 and (ii) a moving speed of the communication terminal.

(Example Advantage of Base Station 2)

As described above, the base station 2 employs the configuration of including: the information acquisition section 21 for acquiring information from a communication terminal that includes an antenna section whose directivity is controllable, the information indicating a first directivity of the antenna section, a location of the communication terminal, and a moving speed of the communication terminal in a case where the communication terminal is communicating with the base station 2; and the instruction section 22 for instructing the communication terminal to carry out communication with the base station 2 via the antenna section by controlling the directivity of the antenna section to be a second directivity which is narrower than the first directivity. Moreover, the instruction section 22 decides the second directivity on the basis of (i) relative locations of the base station 2 and the communication terminal based on the information acquired by the information acquisition section 21 and (ii) a moving speed of the communication terminal. Therefore, according to the base station 2, an example advantage similar to that of the foregoing communication terminal 1 is brought about.

(Flow of Communication Control Method S2)

Figure 4:
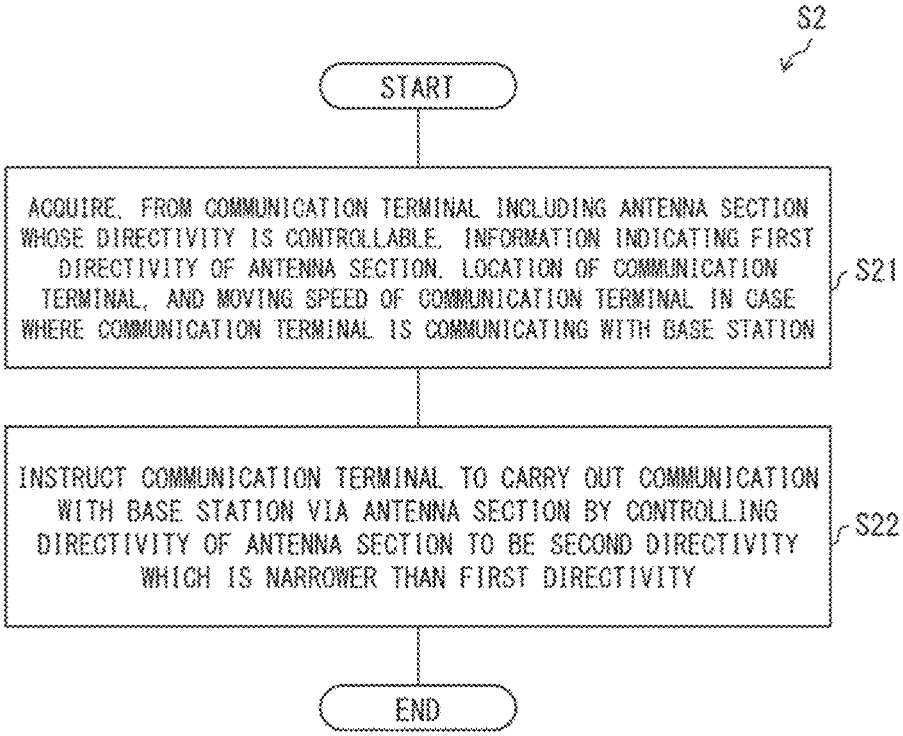
FIG. 4 is a flowchart illustrating a flow of a communication control method in accordance with the present disclosure.

The following description will discuss a flow of a communication control method S2 which is carried out by the base station, with reference to FIG. 4. FIG. 4 is a flowchart illustrating the flow of the communication control method S2. As illustrated in FIG. 4, the communication control method S2 includes an information acquisition process S21 and an instruction process S22.

(Information Acquisition Process S21)

In the information acquisition process S21, the information acquisition section 21 acquires, from a communication terminal including an antenna section whose directivity is controllable, information indicating a first directivity of the antenna section, a location of the communication terminal, and a moving speed of the communication terminal in a case where the communication terminal is communicating with the base station 2.

(Instruction Process S22)

In the instruction process S22, the instruction section 22 instructs the communication terminal to carry out communication with the base station 2 via the antenna section by controlling the directivity of the antenna section to be a second directivity which is narrower than the first directivity. Specifically, in the instruction process S22, the instruction section 22 decides the second directivity on the basis of (i) relative locations of the base station 2 and the communication terminal based on the information acquired by the information acquisition section 21 and (ii) a moving speed of the communication terminal.

(Example Advantage of Communication Control Method S2)

As described above, the communication control method S2 employs the configuration of including: the information acquisition process S21 of acquiring, by the information acquisition section 21, information from a communication terminal that includes an antenna section whose directivity is controllable, the information indicating a first directivity of the antenna section, a location of the communication terminal, and a moving speed of the communication terminal in a case where the communication terminal is communicating with the base station 2; and the instruction process S22 of instructing, by the instruction section 22, the communication terminal to carry out communication with the base station 2 via the antenna section by controlling the directivity of the antenna section to be a second directivity which is narrower than the first directivity. Moreover, in the instruction process S22, the instruction section 22 decides the second directivity on the basis of (i) relative locations of the base station 2 and the communication terminal based on the information acquired by the information acquisition section 21 and (ii) a moving speed of the communication terminal. Therefore, according to the communication control method S2, an example advantage similar to that of the foregoing communication terminal 1 is brought about.

(Configuration of Communication System 100)

Figure 5:
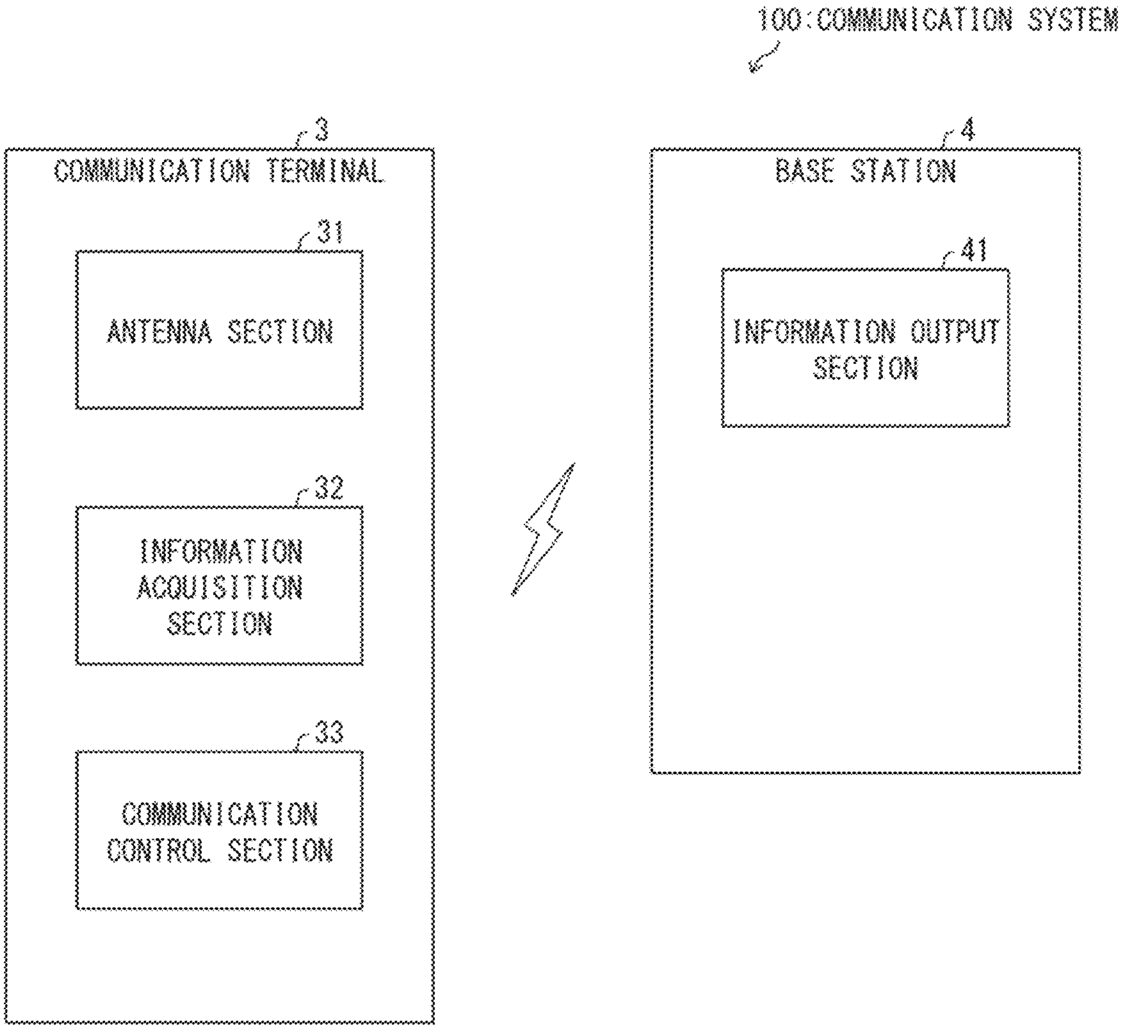
FIG. 5 is a block diagram illustrating a configuration of a communication system in accordance with the present disclosure.

The following description will discuss a configuration of a communication system 100, with reference to FIG. 5. FIG. 5 is a block diagram illustrating the configuration of the communication system 100. As illustrated in FIG. 5, the communication system 100 includes a communication terminal 3 and a base station 4.

As illustrated in FIG. 5, the communication terminal 3 includes an antenna section 31, an information acquisition section 32, and a communication control section 33. In the present example embodiment, the information acquisition section 32 and the communication control section 33 are components for implementing the information acquisition means and the communication control means, respectively.

The antenna section 31 is an antenna whose directivity is controllable.

The information acquisition section 32 controls the directivity to be a first directivity, and acquires information indicating a location of the base station 4 from the base station 4 via the antenna section 31.

The communication control section 33 controls the directivity of the antenna section 31 to be a second directivity which is narrower than the first directivity and carries out communication with the base station 4 via the antenna section 31. Specifically, the communication control section 33 decides the second directivity on the basis of (i) relative locations of the base station 4 and the communication terminal 3 based on the information acquired by the information acquisition section 32 and (ii) a moving speed of the communication terminal 3.

As illustrated in FIG. 5, the base station 4 includes an information output section 41. In the present example embodiment, the information output section 41 is a component for implementing the information output means.

The information output section 41 outputs information indicating a location of the base station 4 to the communication terminal 3.

(Example Advantage of Communication System 100)

As described above, the communication system 100 employs the configuration of including the communication terminal 3 and the base station 4.

The communication terminal 3 employs the configuration of including: the antenna section 31 whose directivity is controllable; the information acquisition section 32 for acquiring information indicating a location of the base station 4 from the base station 4 via the antenna section 31 by controlling the directivity of the antenna section 31 to be a first directivity; and the communication control section 33 for carrying out communication with the base station 4 via the antenna section 31 by controlling the directivity of the antenna section 31 to be a second directivity which is narrower than the first directivity. Moreover, the communication control section 33 decides the second directivity on the basis of (i) relative locations of the base station 4 and the communication terminal 3 based on the information acquired by the information acquisition section 32 and (ii) a moving speed of the communication terminal 3.

The base station 4 employs the configuration of including the information output section 41 which outputs information indicating a location of the base station 4 to the communication terminal 3.

Therefore, according to the communication system 100, an example advantage similar to that of the foregoing communication terminal 1 is brought about.

(Flow of Communication Control Method S100)

Figure 6:
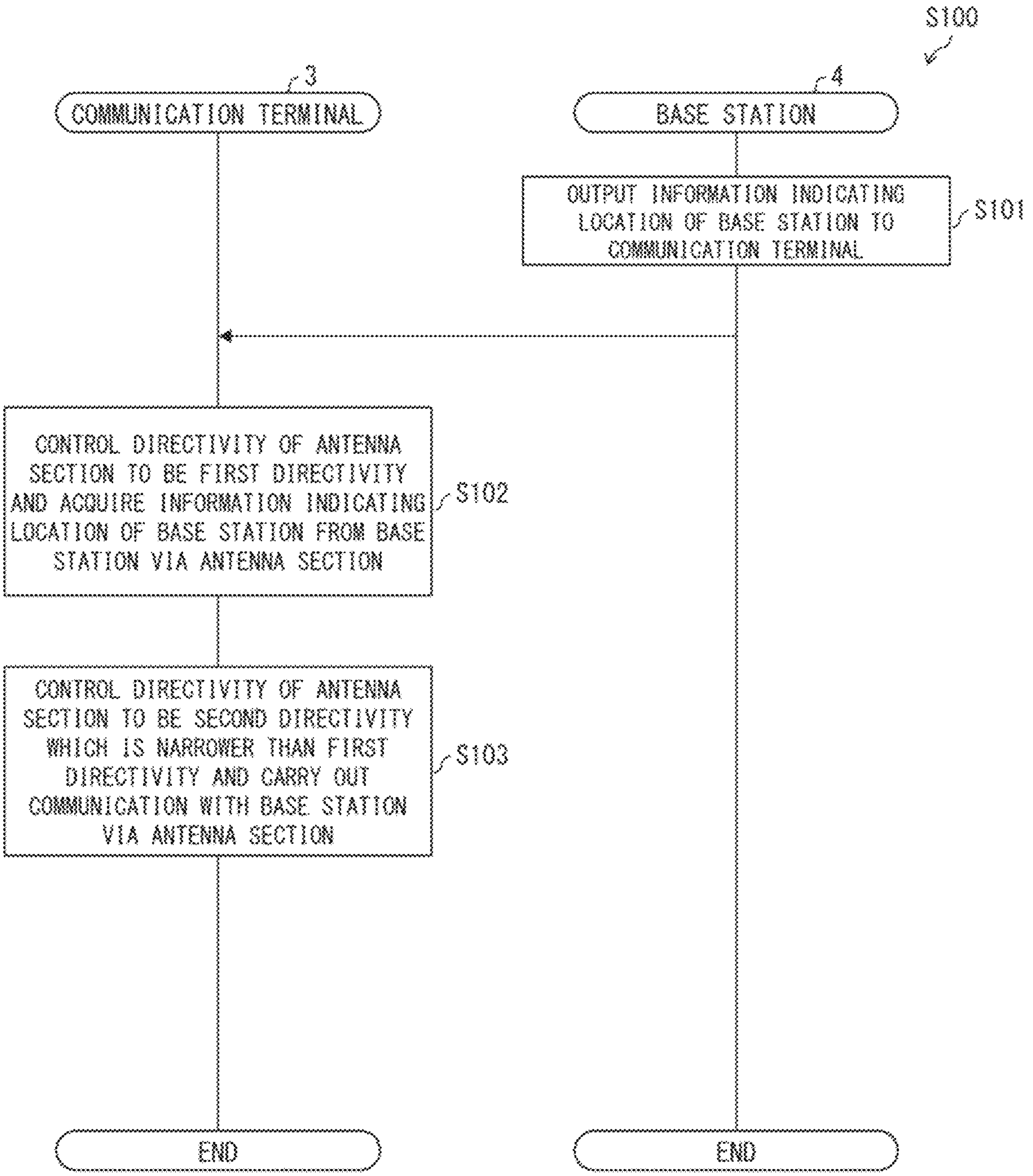
FIG. 6 is a flowchart illustrating a flow of a communication control method in accordance with the present disclosure.

The following description will discuss a flow of a communication control method S100, with reference to FIG. 6. FIG. 6 is a flowchart illustrating the flow of the communication control method S100. The communication control method S100 includes an information output process S101, an information acquisition process S102, and a communication control process S103, as illustrated in FIG. 6.

(Information Output Process S101)

In the information output process S101, the information output section 41 of the base station 4 outputs information indicating a location of the base station 4 to the communication terminal 3.

(Information Acquisition Process S102)

In the information acquisition process S102, the information acquisition section 32 of the communication terminal 3 including the antenna section 31 whose directivity is controllable controls the directivity of the antenna section 31 to be a first directivity, and acquires information indicating a location of the base station 4 from the base station 4 via the antenna section 31.

(Communication Control Process S103)

In the communication control process S103, the communication control section 33 controls the directivity of the antenna section 31 to be a second directivity which is narrower than the first directivity and carries out communication with the base station 4 via the antenna section 31. Specifically, in the communication control process S103, the communication control section 33 decides the second directivity on the basis of (i) relative locations of the base station 4 and the communication terminal 3 based on the information acquired by the information acquisition section 32 and (ii) a moving speed of the communication terminal 3.

(Example Advantage of Communication Control Method S100)

As described above, the communication control method S100 employs the configuration of including the information output process S101 in which the information output section 41 of the base station 4 outputs information indicating a location of the base station 4 to the communication terminal 3.

Moreover, the communication control method S100 employs the configuration of including: the information acquisition process S102 of acquiring, by the information acquisition section 32 of the communication terminal 3 including the antenna section 31 whose directivity is controllable, information indicating a location of the base station 4 from the base station 4 via the antenna section 31 by controlling the directivity of the antenna section 31 to be a first directivity; and the communication control process S103 of carrying out, by the communication control section 33, communication with the base station 4 via the antenna section 31 by controlling the directivity of the antenna section 31 to be a second directivity which is narrower than the first directivity. Moreover, in the communication control process S103, the communication control section 33 decides the second directivity on the basis of (i) relative locations of the base station 4 and the communication terminal 3 based on the information acquired by the information acquisition section 32 and (ii) a moving speed of the communication terminal 3.

Therefore, according to the communication control method S100, an example advantage similar to that of the foregoing communication terminal 1 is brought about.

(Configuration of Communication System 200)

Figure 7:
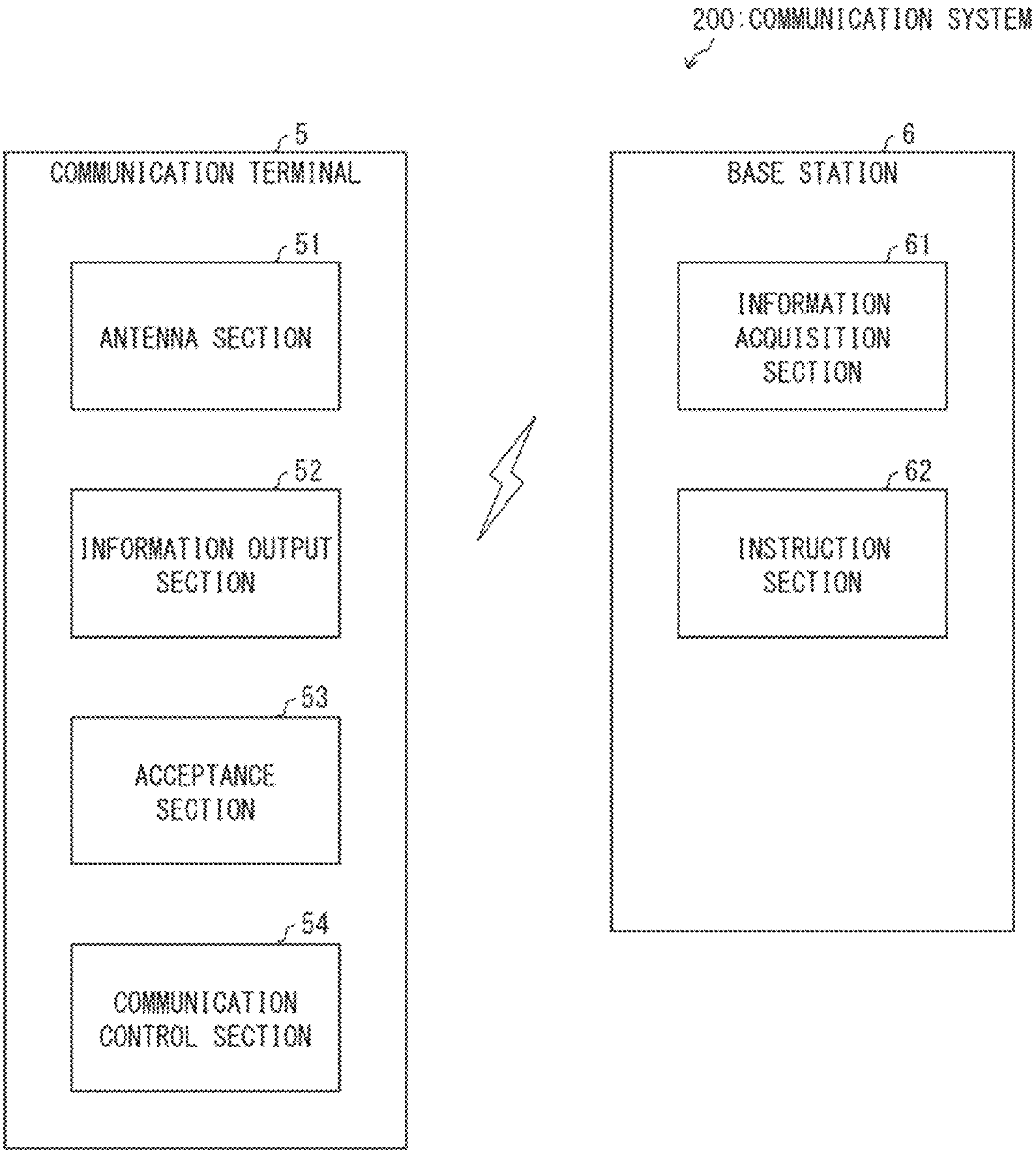
FIG. 7 is a block diagram illustrating a configuration of a communication system in accordance with the present disclosure.

The following description will discuss a configuration of a communication system 200, with reference to FIG. 7. FIG. 7 is a block diagram illustrating the configuration of the communication system 200. As illustrated in FIG. 7, the communication system 200 includes a communication terminal 5 and a base station 6.

As illustrated in FIG. 7, the communication terminal 5 includes an antenna section 51, an information output section 52, an acceptance section 53, and a communication control section 54. In the present example embodiment, the information output section 52, the acceptance section 53, and the communication control section 54 are components for implementing the information output means, the acceptance means, and the communication control means, respectively.

The antenna section 51 is an antenna whose directivity is controllable.

The information output section 52 outputs, to the base station 6, information indicating a first directivity of the antenna section 51, a location of the communication terminal 5, and a moving speed of the communication terminal 5 in a case where the communication terminal 5 is communicating with the base station 6.

The acceptance section 53 accepts an instruction from the base station 6.

The communication control section 54 carries out communication with the base station 6 via the antenna section 51 by controlling the directivity of the antenna section 51 in accordance with the instruction accepted by the acceptance section 53.

As illustrated in FIG. 7, the base station 6 includes an information acquisition section 61 and an instruction section 62. In the present example embodiment, the information acquisition section 61 and the instruction section 62 are components for implementing the information acquisition means and the instruction means, respectively.

The information acquisition section 61 acquires, from the communication terminal 5, information indicating the first directivity, the location of the communication terminal 5, and the moving speed of the communication terminal 5.

The instruction section 62 instructs the communication terminal 5 to carry out communication with the base station 6 via the antenna section 51 by controlling the directivity of the antenna section 51 to be a second directivity which is narrower than the first directivity. Specifically, the instruction section 62 decides the second directivity on the basis of (i) relative locations of the base station 6 and the communication terminal 5 based on the information acquired by the information acquisition section 61 and (ii) the moving speed of the communication terminal 5.

(Example Advantage of Communication System 200)

As described above, the communication system 200 employs the configuration of including the communication terminal 5 and the base station 6.

The communication terminal 5 employs the configuration of including: the antenna section 51 whose directivity is controllable; the information output section 52 for outputting, to the base station 6, information indicating a first directivity of the antenna section 51, a location of the communication terminal 5, and a moving speed of the communication terminal 5 in a case where the communication terminal 5 is communicating with the base station 6; an acceptance section 53 for accepting an instruction from the base station 6; and the communication control section 54 for carrying out communication with the base station 6 via the antenna section 51 by controlling the directivity of the antenna section 51 in accordance with the instruction accepted by the acceptance section 53.

The base station 6 employs the configuration of including: the information acquisition section 61 for acquiring information from the communication terminal 5, the information n indicating a first directivity, a location of the communication terminal 5, and a moving speed of the communication terminal 5; and the instruction section 62 for instructing the communication terminal 5 to carry out communication with the base station 6 via the antenna section 51 by controlling the directivity of the antenna section 51 to be a second directivity which is narrower than the first directivity. Moreover, the instruction section 62 decides the second directivity on the basis of (i) relative locations of the base station 6 and the communication terminal 5 based on the information acquired by the information acquisition section 61 and (ii) a moving speed of the communication terminal 5.

Therefore, according to the communication system 200, an example advantage similar to that of the foregoing communication terminal 1 is brought about.

(Flow of Communication Control Method S200)

Figure 8:
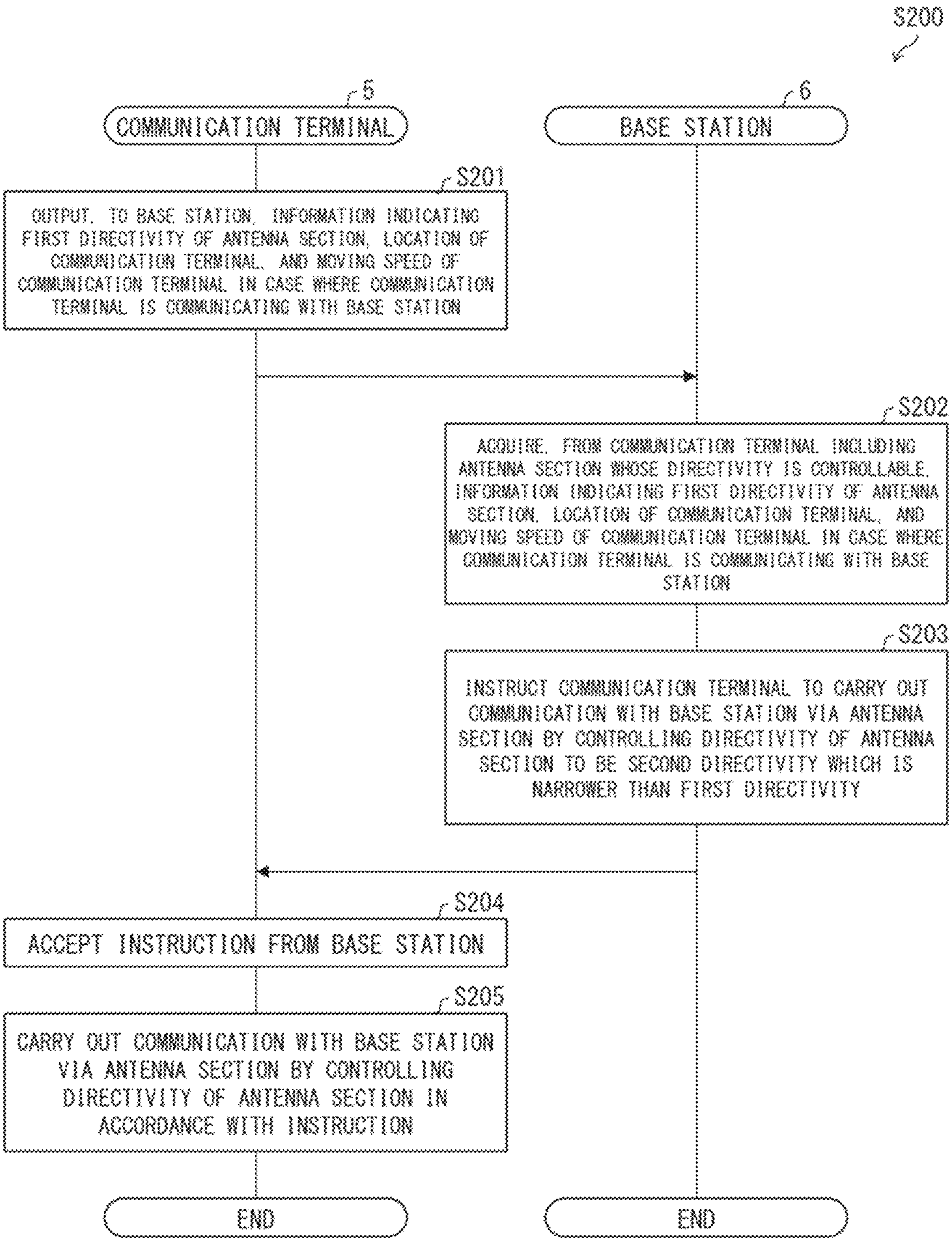
FIG. 8 is a flowchart illustrating a flow of a communication control method in accordance with the present disclosure.

The following description will discuss a flow of a communication control method S200, with reference to FIG. 8. FIG. 8 is a flowchart illustrating the flow of the communication control method S200. As illustrated in FIG. 8, the communication control method S200 includes an information output S201, process an information acquisition process S202, an instruction process S203, an acceptance process S204, and a communication control process S205.

(Information Output Process S201)

In the information output process S201, the information output section 52 of the communication terminal 5 whose directivity is controllable outputs, to the base station 6, information indicating a first directivity of the antenna section 51, a location of the communication terminal 5, and a moving speed of the communication terminal 5 in a case where the communication terminal 5 is communicating with the base station 6.

(Information Acquisition Process S202)

In the information acquisition process S202, the information acquisition section 61 of the base station 6 acquires, from the communication terminal 5, information indicating the first directivity, the location of the communication terminal 5, and the moving speed of the communication terminal 5.

(Instruction process S203)

In the instruction process S203, the instruction section 62 instructs the communication terminal 5 to carry out communication with the base station 6 via the antenna section 51 by controlling the directivity of the antenna section 51 to be a second directivity which is narrower than the first directivity. Specifically, in the instruction process S203, the instruction section 62 decides the second directivity on the basis of (i) relative locations of the base station 6 and the communication terminal 5 based on the information acquired by the information acquisition section 61 and (ii) the moving speed of the communication terminal 5.

(Acceptance Process S204)

In the acceptance process S204, the acceptance section 53 accepts an instruction from the base station 6.

(Communication Control Process S205)

In the communication control process S205, the communication control section 54 carries out communication with the base station 6 via the antenna section 51 by controlling the directivity of the antenna section 51 in accordance with the instruction accepted by the acceptance section 53.

(Example Advantage of Communication Control Method S200)

As described above, the communication control method S200 employs the configuration of including the information output process S201 of outputting, by the information output section 52 of the communication terminal 5 whose directivity is controllable, to the base station 6, information indicating a first directivity of the antenna section 51, a location of the communication terminal 5, and a moving speed of the communication terminal 5 in a case where the communication terminal 5 is communicating with the base station 6.

Moreover, the communication control method S200 employs the configuration of including: the information acquisition process S202 of acquiring, by the information acquisition section 61 of the base station 6, information from the communication terminal 5, the information indicating a first directivity, a location of the communication terminal 5, and a moving speed of the communication terminal 5; and the instruction process S203 of instructing, by the instruction section 62, the communication terminal 5 to carry out communication with the base station 6 via the antenna section 51 by controlling the directivity of the antenna section 51 to be a second directivity which is narrower than the first directivity. Moreover, in the instruction process S203, the instruction section 62 decides the second directivity on the basis of (i) relative locations of the base station 6 and the communication terminal 5 based on the information acquired by the information acquisition section 61 and (ii) the moving speed of the communication terminal 5.

Moreover, the communication control method S200 employs the configuration of including: the acceptance process S204 of accepting, by the acceptance section 53 of the communication terminal 5, the instruction from the base station 6; and the communication control process S205 of carrying out, by the communication control section 54, communication with the base station 6 via the antenna section 51 by controlling the directivity of the antenna section 51 in accordance with the instruction accepted by the acceptance section 53.

Therefore, according to the communication control method S200, an example advantage similar to that of the foregoing communication terminal 1 is brought about.

Second Example Embodiment

The following description will discuss a second example embodiment, which is an example of an embodiment of the present invention, in detail, with reference to the drawings. The same reference numerals are given to constituent elements having the same functions as those described in the foregoing example embodiment, and descriptions of such constituent elements are omitted as appropriate. Note that an application scope of technical means which are employed in the present example embodiment is not limited to the present example embodiment. That is, technical means employed in the present example embodiment can be employed also in the other example embodiments included in the present disclosure, within a range in which no particular technical problem occurs. Moreover, technical means indicated in the drawings referred to for describing the present example embodiment can be employed also in the other example embodiments included in the present disclosure, within a range in which no particular technical problem occurs.

(Configuration of Communication System 110)

Figure 9:
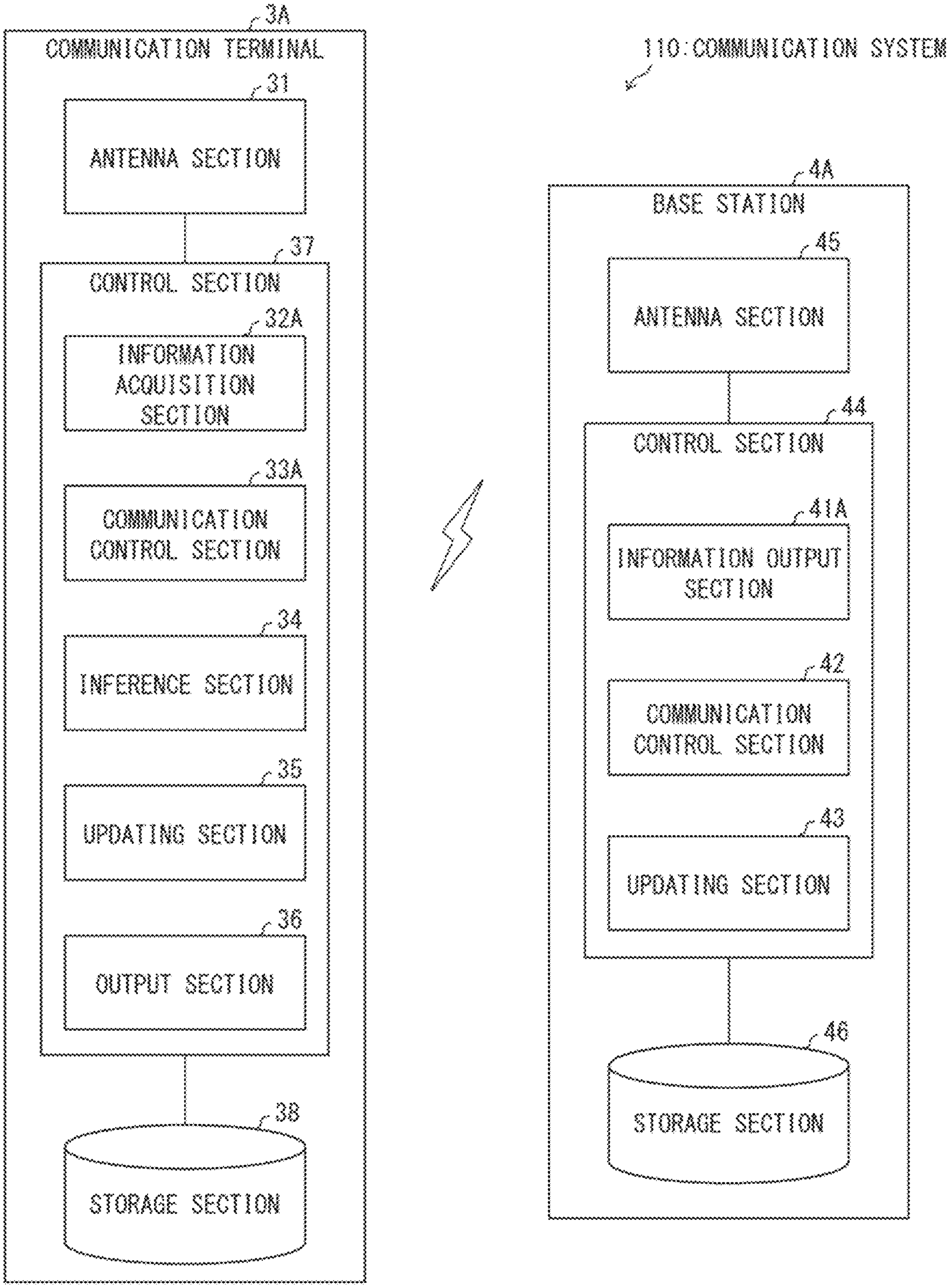
FIG. 9 is a block diagram illustrating a configuration of a communication system in accordance with the present disclosure.

The following description will discuss a configuration of a communication system 110, with reference to FIG. 9. FIG. 9 is a block diagram illustrating the configuration of the communication system 110.

As illustrated in FIG. 9, the communication system 110 includes a communication terminal 3A and a base station 4A. In the communication system 110, the communication terminal 3A and the base station 4A can mutually carry out transmission and reception of data via wireless communication. In FIG. 9, a single communication terminal 3A and a single base station 4A are provided. Note, however, that the number of communication terminals 3A and the number of base stations 4A included in the communication system 110 are not limited. It is possible to employ a configuration in which a plurality of communication terminals 3A and a plurality of base stations 4A are provided.

(Overview of Communication System 110)

Figure 10:
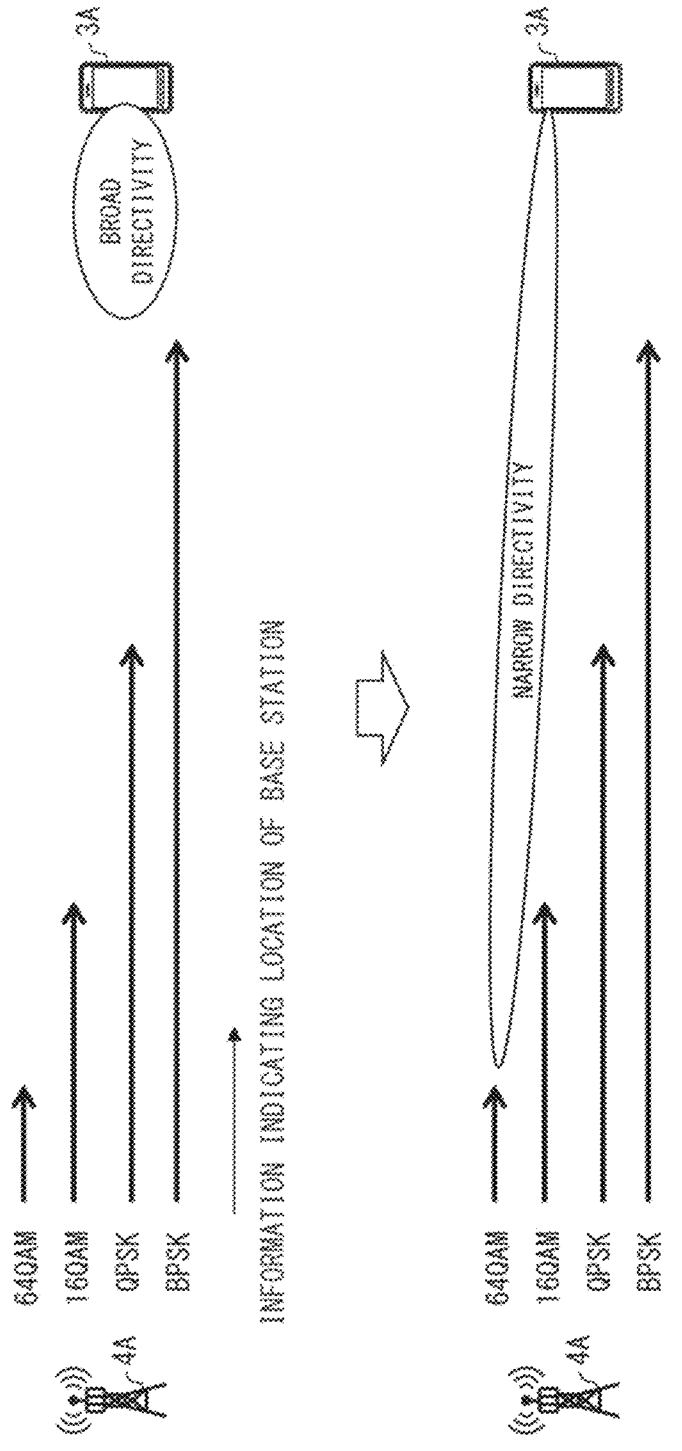
FIG. 10 is a diagram illustrating an example of a communication mode in a communication system in accordance with the present disclosure.

The following description will discuss an overview of the communication system 110, with reference to FIG. 10. FIG. 10 is a diagram illustrating the overview of the communication system 110.

The communication terminal 3A includes an antenna section (antenna section 31 described later) whose directivity is controllable. The communication terminal 3A and the base station 4A illustrated in FIG. 10 carry out communication using, as an example of modulating method, one of 64 quadrature amplitude modulation (QAM), 16QAM, quadrature phase shift keying (QPSK), and binary phase shift keying (BPSK).

As illustrated in the upper part of FIG. 10, the communication terminal first attempts 3A to establish communication with the base station 4A by controlling the directivity of the antenna section to be a broad directivity (e.g., a broadest directivity). With this configuration, the communication terminal 3A can easily find the base station 4A.

In a case where the communication terminal 3A attempts to establish communication with the base station 4A, as illustrated in the upper part of FIG. 10, communication between the communication terminal 3A and the base station 4A uses a modulating method in which the modulation multilevel number is small (in other words, a modulating method (e.g., BPSK in FIG. 10) with a long effective communication range). With this configuration, the communication terminal 3A and the base station 4A can easily establish communication. The directivity of the antenna section of the communication terminal 3A in a case where communication has been established between the communication terminal 3A and the base station 4A is referred to as a first directivity. The first directivity is as described above.

In a case where the communication terminal 3A and the base station 4A have established communication, as illustrated in the upper part of FIG. 10, the base station 4A outputs information indicating a location of the base station 4A to the communication terminal 3A. Upon acquisition of the information indicating the location of the base station 4A, as illustrated in the lower part of FIG. 10, the communication terminal 3A carries out communication with the base station 4A by controlling the directivity of the antenna section to be a directivity which is narrower than the first directivity on the basis of the information and a moving speed of the communication terminal 3A. In this configuration, the directivity which is narrower than the first directivity in the communication terminal 3A is referred to as a second directivity. The second directivity is as described above.

In a case where the communication terminal 3A carries out communication with the base station 4A with the second directivity, as illustrated in the lower part of FIG. 10, the communication between the communication terminal 3A and the base station 4A is carried out using a modulating method in which the modulation multilevel number is large (in other words, a modulating method (e.g., 64QAM in FIG. 10) with which a throughput is high is used). With this configuration, a high throughput can be achieved in communication between the communication terminal 3A and the base station 4A.

(Configuration of Communication Terminal 3A)

As illustrated in FIG. 9, the communication terminal 3A includes a control section 37 and a storage section 38, in addition to the antenna section 31 included in the communication terminal 3.

The antenna section 31 is, as described above, an antenna section whose directivity is controllable. Specific examples of the antenna section 31 include, but not limited to, a multi-element antenna. The communication terminal 3A carries out wireless communication with the base station 4A via the antenna section 31.

The storage section 38 stores data which the control section 37 refers to. Examples of data stored in the storage section 38 include, but not limited to, a radio wave map indicating radio wave statuses at respective places and a map. Examples of the radio wave status include, but not limited to, received power. Examples of the storage section 38 include, but not limited to, a flash memory, a hard disk drive (HDD), a solid state drive (SSD), and a combination thereof.

(Control Section 37)

The control section 37 controls each constituent element included in the communication terminal 3A. As illustrated in FIG. 9, the control section 37 includes an information acquisition section 32A, a communication control section 33A, an inference section 34, an updating section 35, and an output section 36. In the present example embodiment, the information acquisition section 32A, the communication control section 33A, the inference section 34, and the updating section 35 are components for implementing the information acquisition means, the communication control means, the inference means, and the updating means, respectively.

The information acquisition section 32A controls the antenna section 31 to acquire information from the base station 4A. For example, the information acquisition section 32A controls the directivity of the antenna section 31 to be a first directivity, and acquires information indicating a location of the base station 4A from the base station 4A via the antenna section 31. As another example, the information acquisition section 32A acquires a radio wave map from the base station 4A.

The communication control section 33A controls communication with the base station 4A. For example, the communication control section 33A controls the directivity of the antenna section 31 to be a first directivity, and establishes communication with the base station 4A via the antenna section 31.

Moreover, the communication control section 33A controls the directivity of the antenna section 31 to be a second directivity which is narrower than the first directivity and carries out communication with the base station 4A via the antenna section 31. More specifically, the communication control section 33A decides the second directivity on the basis of (i) relative locations of the base station 4A and the communication terminal 3A based on the information acquired by the information acquisition section 32A and (ii) a moving speed of the communication terminal 3A. The communication control section 33A may calculate the moving speed of the communication terminal 3A on the basis of information acquired from a sensor (not illustrated in FIG. 9).

The communication control section 33A may decide the second directivity on the basis of an orientation of the communication terminal 3A in addition to the relative locations of the base station 4A and the communication terminal 3A and the moving speed of the communication terminal 3A. For example, in a case where the orientation of the communication terminal 3A is an orientation with which radio waves in a predetermined direction cannot be received, the communication control section 33A carries out communication with a base station 4A in a direction different from that predetermined direction.

The communication control section 33A decides a communication mode of the communication with the base station 4A via the antenna section 31 on the basis of the relative locations of the base station 4A and the communication terminal 3A and the moving speed of the communication terminal 3A. Examples of the communication mode include, but not limited to, modulating methods (e.g., 64QAM, 16QAM, QPSK, BPSK) and an error correction ratio. A process which is carried out by the communication control section 33A will be described later.

The inference section 34 infers a destination where the communication terminal 3A reaches after a predetermined time period. For example, the following method is employed in which the inference section 34 infers a destination where the communication terminal 3A reaches after a predetermined time period, with reference to information indicating a moving speed of the communication terminal 3A, a map stored in the storage section 38, and a location of the communication terminal 3A. Examples of information indicating a location of the communication terminal 3A include a global positioning system (GPS) signal.

For example, in a case where the location of the communication terminal 3A is along a road, the inference section 34 infers, as the destination where the communication terminal 3A reaches after a predetermined time period, a location where the communication terminal 3A would reach after moving along the road for the predetermined time period at the moving speed of the communication terminal 3A.

The updating section 35 updates the radio wave map stored in the storage section 38. For example, the updating section 35 updates the radio wave map by associating current received power of the communication terminal 3A with a location where the communication terminal 3A is currently present in the radio wave map. As another example, the updating section 35 updates the radio wave map stored in the storage section 38 to a radio wave map acquired by the information acquisition section 32A from the base station 4A.

The updating section 35 may associate the location in the radio wave map with a setting of the communication terminal 3A. For example, the updating section 35 may associate the location in the radio wave map with a communication mode in which the communication terminal 3A is communicating with the base station 4A at the location. As another example, the updating section 35 may associate the location in the radio wave map with a communication mode in which the communication terminal 3A could not communicate with the base station 4A at the location.

The output section 36 outputs information to the base station 4A. For example, the output section 36 outputs, to the base station 4A, information indicating a location where the communication terminal 3A is currently present and current received power of the communication terminal 3A.

(Configuration of Base Station 4A)

The base station 4A includes a control section 44, an antenna section 45, and a storage section 46.

The antenna section 45 is an antenna for carrying out wireless communication with the communication terminal 3A. The base station 4A carries out wireless communication with the communication terminal 3A via the antenna section 45.

The storage section 46 stores data which the control section 44 refers to. Examples of data stored in the storage section 46 include information indicating a location of the base station 4A and the above-described radio wave map. Examples of the storage section 46 include, but not limited to, a flash memory, an HDD, an SSD, and a combination thereof.

(Control Section 44)

The control section 44 controls each constituent element included in the base station 4A. As illustrated in FIG. 9, the control section 44 includes an information output section 41A, a communication control section 42, and an updating section 43. In the present example embodiment, the information output section 41A, the communication control section 42, and the updating section 43 are components for implementing the information output means, the communication control means, and the updating means, respectively.

The information output section 41A outputs information to the communication terminal 3A. For example, the information output section 41A outputs information indicating a location of the base station 4A to the communication terminal 3A. As another example, a radio wave map stored in the storage section 46 is output to the communication terminal 3A.

The communication control section 42 controls communication with the communication terminal 3A. For example, the communication control section 42 establishes communication with the communication terminal 3A via the antenna section 45.

Moreover, the communication control section 42 decides a communication mode of communication with the communication terminal 3A via the antenna section 45. For example, the communication control section 42 acquires information pertaining to a state of a channel from the communication terminal 3A and decides a communication mode on the basis of the information. The process in which the communication control section 42 decides a communication mode will be described later.

The updating section 43 updates the radio wave map stored in the storage section 46. For example, the updating section 43 acquires, from the communication terminal 3A, information indicating a location where the communication terminal 3A is currently present and current received power of the communication terminal 3A. Moreover, the updating section 43 updates, in the radio wave map, received power at the location indicated by the acquired information to the received power indicated by the acquired information.

The updating section 43 may acquire, from each of a plurality of communication terminals 3A, information indicating a location where that communication terminal 3A is currently present and current received power of that communication terminal 3A. In this case, for a certain communication terminal 3A, the radio wave map is a radio wave map in which a radio wave status of the certain communication terminal 3A and radio wave statuses of one or more other communication terminals 3A, which are different from the certain communication terminal 3A, are reflected. With this configuration, the updating section 43 can create a radio wave map reflecting radio wave statuses of the plurality of communication terminals 3A.

Example 1 of Process in which Communication Control Section 33A Decides Second Directivity Examples of a process in which the communication control section 33A decides the second directivity include a process in which the communication control section 33A decides the second directivity using a learning model which has been trained to output the second directivity upon receipt of input of at least relative locations of the base station 4A and the communication terminal 3A and a moving speed of the communication terminal 3A.

The learning model is generated by training using, as training data, communication statuses in the past. For example, the learning model is trained using, as training data, a set of relative locations of the base station 4A and the communication terminal 3A in the past, a moving speed of the communication terminal 3A in the past, and a second directivity in the past. Examples of the learning model include a convolutional neural network (CNN).

Thus, the communication control section 33A can suitably decide the second directivity by deciding the second directivity using the learning model. In other words, the communication control section 33A can decide a suitable second directivity without deciding a second directivity by gradually broadening the directivity from the first directivity. Therefore, the communication control section 33A can shorten a time taken to set an antenna directivity of the communication terminal 3A to be suitable for communication.

Example 2 of Process in which Communication Control Section 33A Decides Second Directivity Another example of the process in which the communication control section 33A decides the second directivity can be a process in which the communication control section 33A decides the second directivity on the basis of (i) relative locations of the base station 4A and the communication terminal 3A, (ii) a moving speed of the communication terminal 3A, and (iii) a radio wave map which is stored in the storage section 38 and which indicates radio wave statuses at respective places. The radio wave map in this configuration may be a radio wave map generated by the communication terminal 3A or may be a radio wave map acquired from the base station 4A. In a case where the communication control section 33A uses a radio wave map acquired from the base station 4A, the communication control section 33A can also refer to a radio wave status of another communication terminal 3A.

As an example of this configuration, a case is assumed in which the moving speed of the communication terminal 3A is 0 (in other words, the communication terminal 3A is not moving). In this case, the communication control section 33A acquires, from the radio wave map, a radio wave status in a region where the communication terminal 3A is located based on the relative locations of the base station 4A and the communication terminal 3A. Next, the communication control section 33A decides to employ, as the second directivity, a directivity which is narrowest and with which communication with the base station 4A can be established in the radio wave status of the region where the communication terminal 3A is located.

Thus, the communication control section 33A can suitably decide the second directivity by deciding the second directivity based on the radio wave map. In other words, the communication control section 33A can decide a suitable second directivity without deciding a second directivity by gradually broadening the directivity from the first directivity. Therefore, the communication control section 33A can shorten a time taken to set an antenna directivity of the communication terminal 3A to be suitable for communication.

As another example of this configuration, a case is assumed in which the moving speed of the communication terminal 3A is not 0 (in other words, the communication terminal 3A is moving). In this case, the communication control section 33A acquires information indicating a destination where the communication terminal 3A reaches after a predetermined time period, the destination having been inferred by the inference section 34. Next, the communication control section 33A acquires, from the radio wave map, a radio wave status of a region of the destination of the communication terminal 3A, the destination having been inferred by the inference section 34. Subsequently, the communication control section 33A refers to the radio wave map and decides to employ, as a second directivity after a predetermined time period, a directivity which is narrowest and with which communication with the base station 4A can be established in the radio wave status on the basis of the radio wave status of the region of the destination of the communication terminal 3A, the destination having been inferred by the inference section 34.

Thus, even in a case where the communication terminal 3A is moving, the communication control section 33A can suitably decide the second directivity at the destination.

Example 3 of Process in which Communication Control Section 33A Decides Second Directivity Still another example of the process in which the communication control section 33A decides the second directivity can be a process in which the communication control section 33A decides the second directivity on the basis of relative locations of the base station 4A and the communication terminal 3A and a moving speed of the communication terminal 3A.

For example, the communication control section 33A decides a principal direction of the second directivity so that the principal direction of the second directivity is a direction from the communication terminal 3A to the base station 4A corresponding to the relative locations.

As another example, the communication control section 33A decides a width (e.g., beam half-width) of the second directivity in accordance with the moving speed of the communication terminal 3A. For example, a case is assumed in which the moving speed of the communication terminal 3A is greater than a predetermined value (i.e., a case where the moving speed of the communication terminal 3A is high). In this case, the communication control section 33A decides to employ, as the second directivity, a broadest directivity among directivities which are narrower than the first directivity and with which the communication terminal 3A and the base station 4A can establish communication. As another example, a case is assumed in which the moving speed of the communication terminal 3A is equal to or less than the predetermined value (i.e., a case where the moving speed of the communication terminal 3A is low). In this case, the communication control section 33A decides to employ, as the second directivity, a narrowest directivity among directivities which are narrower than the first directivity and with which the communication terminal 3A and the base station 4A can establish communication.

Example 1 of Process in which Communication Control Section 33A Decides Communication Mode As described above, the communication mode may be decided by the communication control section 33A of the communication terminal 3A or may be decided by the communication control section 42 of the base station 4A. The following description will discuss an example of a process in which the communication control section 33A of the communication terminal 3A decides a communication mode.

For example, in a case where the base station 4A adaptively selects a modulating method from a plurality of modulating methods and an error correction ratio from a plurality of error correction ratios to carry out communication, the communication control section 33A of the communication terminal 3A calculates a distance to the base station 4A based on the relative locations of the base station 4A and the communication terminal 3A. The communication control section 33A decides the modulating method and the error correction ratio on the basis of the calculated distance and the moving speed of the communication terminal 3A.

For example, in a case where the moving speed of the communication terminal 3A is 0 (in other words, the communication terminal 3A is not moving), the communication control section 33A decides a modulating method and an error correction ratio in accordance with the calculated distance. For example, as the calculated distance increases, the communication control section 33A decides to employ a modulating method with a smaller modulation multilevel number (in other words, a modulating method with a lower communication speed) and a higher error correction ratio. Meanwhile, as the calculated distance decreases, the communication control section 33A decides to employ a modulating method with a larger modulation multilevel number (in other words, a modulating method with a higher communication speed) and a lower error correction ratio.

As another example, in a case where the moving speed of the communication terminal 3A is not 0 (in other words, the communication terminal 3A is moving), the communication control section 33A acquires information indicating a destination where the communication terminal 3A reaches after a predetermined time period, the destination having been inferred by the inference section 34. Next, the communication control section 33A acquires, from the radio wave map, a radio wave status of a region of the destination of the communication terminal 3A, the destination having been inferred by the inference section 34. Subsequently, the communication control section 33A decides a modulating method and an error correction ratio with reference to the radio wave map. For example, in a case where a radio wave status of a region of the destination of the communication terminal 3A which has been inferred by the inference section 34 is poor (e.g., received power is lower than a predetermined threshold value), the communication control section 33A decides to employ a modulating method with a smaller modulation multilevel number and a higher error correction ratio. Meanwhile, in a case where a radio wave status of a region of the destination of the communication terminal 3A which has been inferred by the inference section 34 is good (e.g., received power is not lower than a predetermined threshold value), the communication control section 33A decides to employ a modulating method with a larger modulation multilevel number and a lower error correction ratio.

As another example, the communication control section 33A may decide the communication mode using a learning model which has been trained to output a communication mode upon receipt of input of at least the calculated distance and the moving speed.

Thus, the communication control section 33A of the communication terminal 3A decides a communication mode of communication between the communication terminal 3A and the base station 4A. Therefore, the communication control section 33A can select an appropriate modulating method and an appropriate error correction ratio in a case where the base station 4A adaptively selects a modulating method from a plurality of modulating methods and an error correction ratio from a plurality of error correction ratios to carry out communication.

Example 2 of Process in which Communication Control Section 33A Decides Communication Mode The communication control section 33A may be configured to monitor quality of communication with the base station 4A. In this configuration, the communication control section 33A decides a modulating method and an error correction ratio in accordance with a radio wave status. Examples of communication quality include, but not limited to, received power.

For example, in a case where a radio wave status with the base station 4A has been equal to or less than a threshold value for a predetermined period, the communication control section 33A decides to employ a modulating method with a smaller modulation multilevel number and a higher error correction ratio. That is, in a case where the quality of communication with the base station 4A has been equal to or less than the threshold value for the predetermined period, the communication control section 33A decides to employ, as the communication mode with the base station 4A, a communication mode in which stable communication is carried out at a low speed. In this case, after the communication mode in which stable communication is carried out at a low speed is decided to be employed, the communication control section 33A may gradually change, at predetermined intervals, the communication mode to a communication mode in which high-speed communication is carried out.

(Example of Process in which Communication Control Section 42 Decides Communication Mode)

The following description will discuss an example of a process in which the communication control section 42 of the base station 4A decides a communication mode.

For example, the communication control section 42 acquires information pertaining to a state of a channel from the communication terminal 3A and decides a communication mode on the basis of the information. For example, in a case where the information acquired from the communication terminal 3A indicates communication quality which is equal to or less than a threshold value, the communication control section 42 decides to employ a modulating method with a smaller modulation multilevel number and a higher error correction ratio. Meanwhile, in a case where the information acquired from the communication terminal 3A indicates communication quality which is greater than a threshold value, the communication control section 42 decides to employ a modulating method with a larger modulation multilevel number and a lower error correction ratio.

Thus, the communication control section 42 of the base station 4A decides a communication mode of communication between the communication terminal 3A and the base station 4A. Therefore, the communication control section 42 can allow the communication terminal 3A and the base station 4A to carry out communication using a suitable communication mode.

(Flow of Communication Control Method S110)

Figure 11:
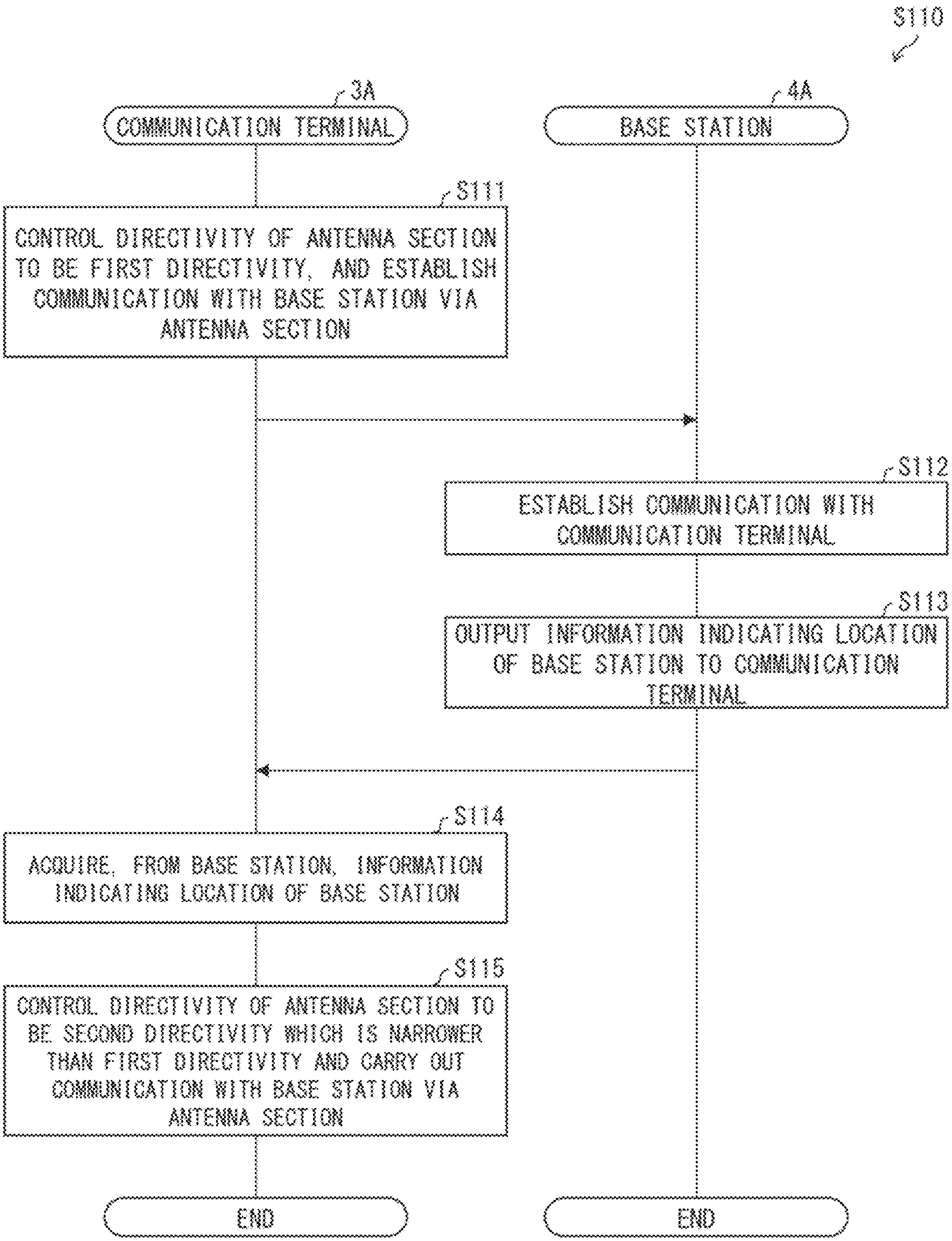
FIG. 11 is a flowchart illustrating a flow of a communication control method in accordance with the present disclosure.

The following description will discuss a flow of a communication control method S110 which is carried out in the communication system 110, with reference to FIG. 11. FIG. 11 is a flowchart illustrating the flow of the communication control method S110.

(Step S111)

In step S111, the communication control section 33A of the communication terminal 3A controls the directivity of the antenna section 31 to be a first directivity, and establishes communication with the base station 4A via the antenna section 31.

(Step S112)

In step S112, the communication control section 42 of the base station 4A establishes communication with the communication terminal 3A via the antenna section 45.

(Step S113)

In step S113, the information output section 41A outputs information indicating a location of the base station 4A to the communication terminal 3A.

(Step S114)

In step S114, the information acquisition section 32A controls the directivity of the antenna section 31 to be a first directivity, and acquires, from the base station 4A, information indicating a location of the base station 4A via the antenna section 31.

(Step S115)

In step S115, the communication control section 33A controls the directivity of the antenna section 31 to be a second directivity which is narrower than the first directivity on the basis of (i) relative locations of the base station 4A and the communication terminal 3A based on the location of the base station 4A and (ii) the moving speed of the communication terminal 3A, and carries out communication with the base station 4A via the antenna section 31.

(Example Advantage of Communication System 110)

As described above, in the communication system 110 including the communication terminal 3A and the base station 4A, the communication terminal 3A decides the second directivity on the basis of (i) relative locations of the base station 4A and the communication terminal 3A based on information indicating a location of the base station 4A acquired from the base station 4A and (ii) the moving speed of the communication terminal 3A.

Therefore, in the communication system 110, a suitable second directivity is decided without deciding a second directivity by gradually broadening the directivity from the first directivity. Therefore, the communication system 110 can bring about an example advantage of shortening a time taken to set an antenna directivity of the communication terminal 3A to be suitable for communication.

Third Example Embodiment

The following description will discuss a third example embodiment, which is an example of an embodiment of the present invention, in detail, with reference to the drawings. The same reference numerals are given to constituent elements having the same functions as those described in the foregoing example embodiments, and descriptions of such constituent elements are omitted as appropriate. Note that an application scope of technical means which are employed in the present example embodiment is not limited to the present example embodiment. That is, technical means employed in the present example embodiment can be employed also in the other example embodiments included in the present disclosure, within a range in which no particular technical problem occurs. Moreover, technical means indicated in the drawings referred to for describing the present example embodiment can be employed also in the other example embodiments included in the present disclosure, within a range in which no particular technical problem occurs.

(Configuration of Communication System 210)

Figure 12:
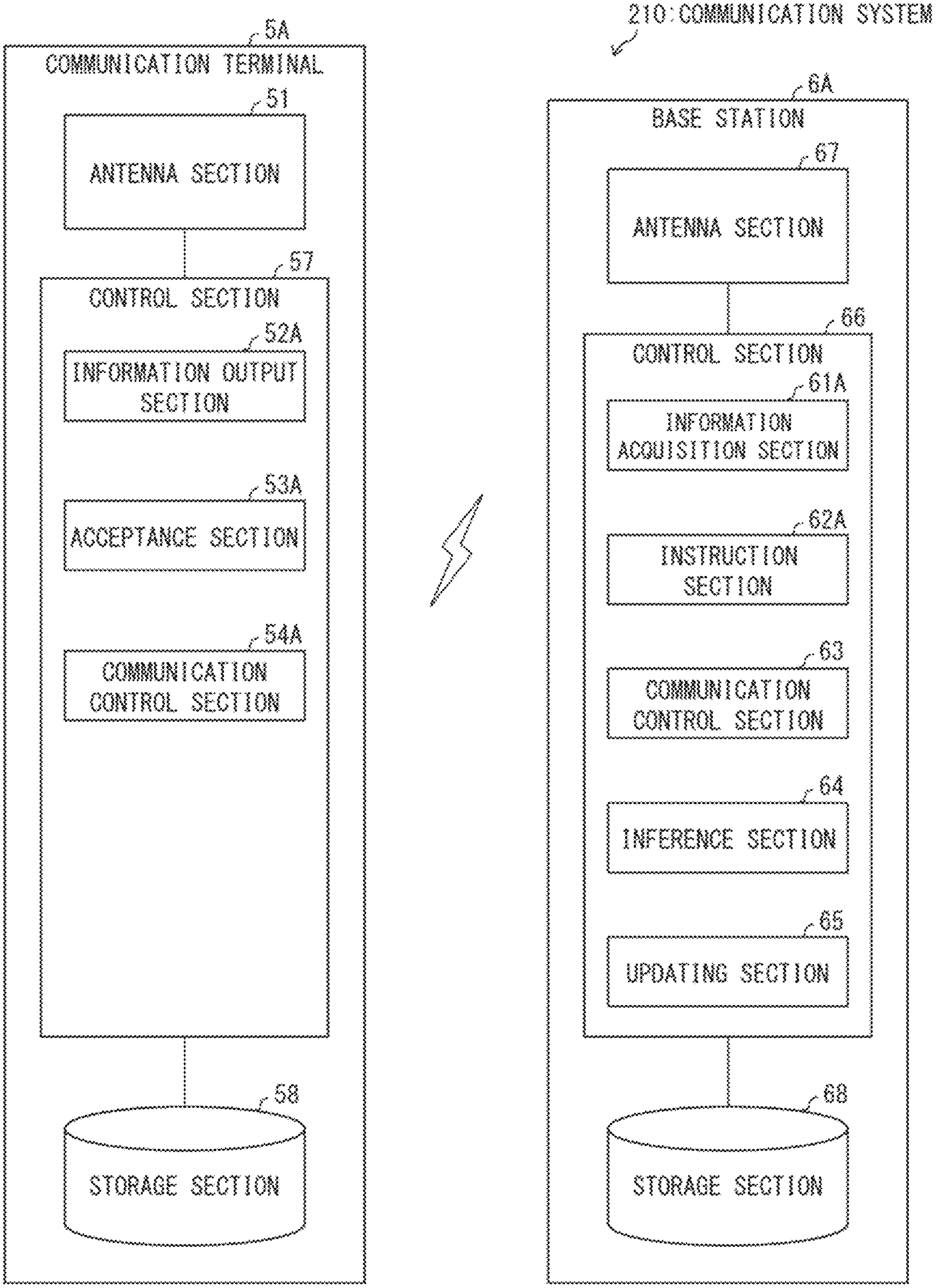
FIG. 12 is a block diagram illustrating a configuration of a communication system in accordance with the present disclosure.

The following description will discuss a configuration of a communication system 210, with reference to FIG. 12. FIG. 12 is a block diagram illustrating the configuration of the communication system 210.

As illustrated in FIG. 12, the communication system 210 includes a communication terminal 5A and a base station 6A. In the communication system 210, similarly to the communication system 110 described above, the communication terminal 5A and the base station 6A can mutually carry out transmission and reception of data via wireless communication. The number of communication terminals 5A and the number of base stations 6A included in the communication system 210 are not limited. It is possible to employ a configuration in which a plurality of communication terminals 5A and a plurality of base stations 6A are included.

(Overview of Communication System 210)

Figure 13:
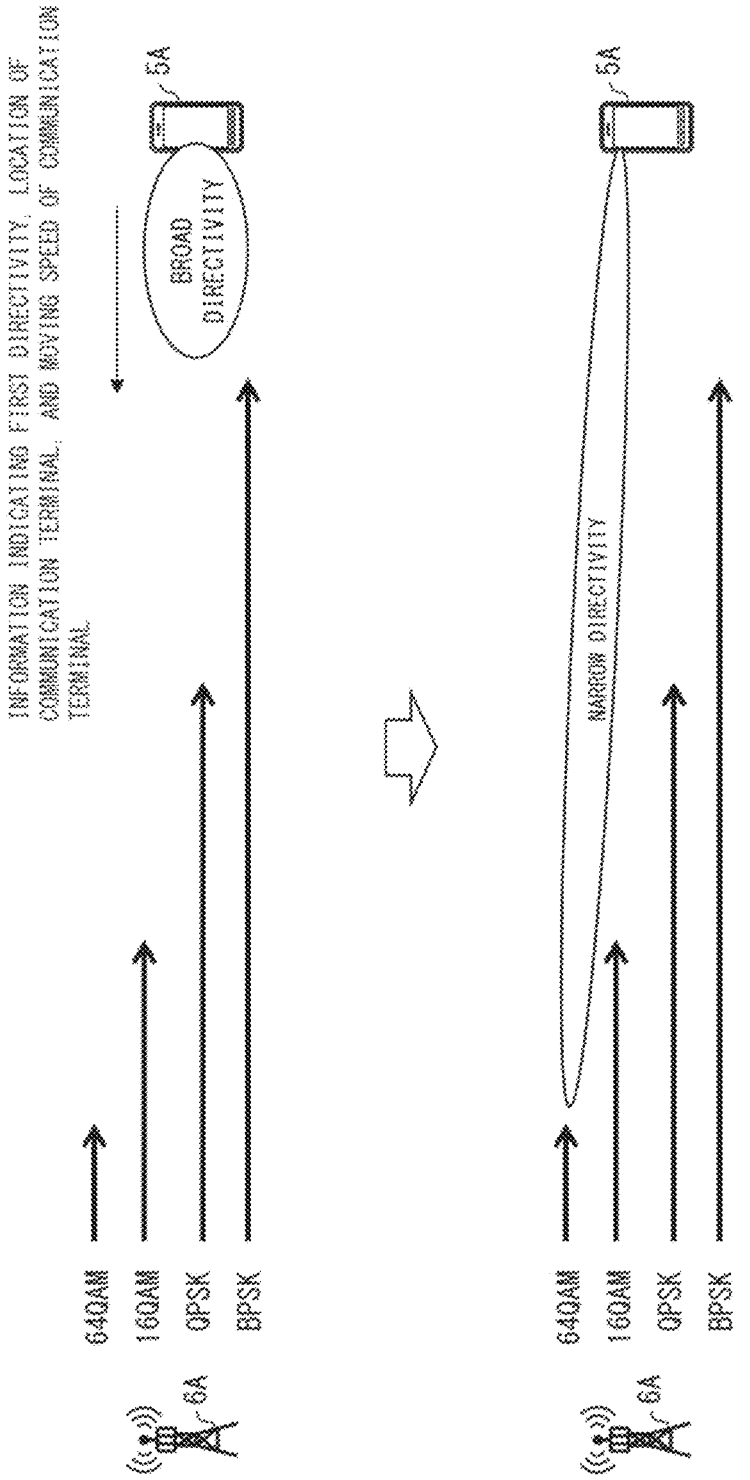
FIG. 13 is a diagram illustrating an example of a communication mode in a communication system in accordance with the present disclosure.

The following description will discuss an overview of the communication system 210, with reference to FIG. 13. FIG. 13 is a diagram illustrating the overview of the communication system 210.

The communication terminal 5A includes an antenna section (antenna section 51 described later) whose directivity is controllable. The communication terminal 5A and the base station 6A illustrated in FIG. 13 carry out communication using, as an example of modulating method, one of 64QAM, 16QAM, QPSK, and BPSK.

As illustrated in the upper part of FIG. 13, the communication terminal 5A first attempts to establish communication with the base station 6A by controlling the directivity of the antenna section to be a broad directivity (e.g., a broadest directivity). With this configuration, the communication terminal 5A can easily find the base station 6A.

In a case where the communication terminal 5A attempts to establish communication with the base station 6A, as illustrated in the upper part of FIG. 13, communication between the communication terminal 5A and the base station 6A uses a modulating method in which the modulation multilevel number is small (in other words, a modulating method (e.g., BPSK in FIG. 13) with a long effective communication range is used). With this configuration, the communication terminal 5A and the base station 6A can easily establish communication. As with the foregoing example embodiments, the directivity of the antenna of the communication terminal 5A in a case where communication has been established between the communication terminal 5A and the base station 6A is referred to as a first directivity.

In a case where the communication terminal 5A and the base station 6A has established communication, as illustrated in the upper part of FIG. 13, the communication terminal 5A outputs, to the base station 6A, information indicating a first directivity, a location of the communication terminal 5A, and a moving speed of the communication terminal 5A. Upon acquisition of the information indicating the first directivity, the location of the communication terminal 5A, and the moving speed of the communication terminal 5A, the base station 6A provides an instruction to the communication terminal 5A. For example, the base station 6A instructs the communication terminal 5A to carry out communication with the base station 6A by controlling the directivity of the antenna section to be a second directivity which is narrower the than first directivity. The communication terminal 5A carries out communication with the base station 6A by controlling the directivity of the antenna section to be a second directivity which is narrower than the first directivity on the basis of the instruction from the base station 6A.

In a case where the communication terminal 5A carries out communication with the base station 6A with the second directivity, as illustrated in the lower part of FIG. 13, the communication between the communication terminal 5A and the base station 6A is carried out using a modulating method in which the modulation multilevel number is large (in other words, a modulating method (e.g., 64QAM in FIG. 13) with which a throughput is high is used). With this configuration, a high throughput can be achieved in communication between the communication terminal 5A and the base station 6A.

(Configuration of Communication Terminal 5A)

As illustrated in FIG. 12, the communication terminal 5A includes a control section 57 and a storage section 58, in addition to the antenna section 51 included in the communication terminal 5.

The antenna section 51 is, as described above, an antenna section whose directivity is controllable. Specific examples of the antenna section 51 include, but not limited to, a multi-element antenna. The communication terminal 5A carries out wireless communication with the base station 6A via the antenna section 51.

The storage section 58 stores data which the control section 57 refers to. The data stored in the storage section 58 and examples are similar to those in the storage section 38 described above.

(Control Section 57)

The control section 57 controls each constituent element included in the communication terminal 5A. As illustrated in FIG. 12, the control section 57 includes an information output section 52A, an acceptance section 53A, and a communication control section 54A. In the present example embodiment, the information output section 52A, the acceptance section 53A, and the communication control section 54A are components for implementing the information output means, the acceptance means, and the communication control means, respectively.

The information output section 52A outputs information to the base station 6A. For example, the information output section 52A outputs, to the base station 6A, information indicating a first directivity of the antenna section 51, a location of the communication terminal 5A, and a moving speed of the communication terminal 5A in a case where the communication terminal 5A is communicating with the base station 6A. As another example, the information output section 52A outputs, to the base station 6A, information indicating a location where the communication terminal 5A is currently present and current received power of the communication terminal 5A. Examples of the information indicating a location of the communication terminal 5A include a GPS signal. The moving speed of the communication terminal 5A can be calculated based on information acquired from a sensor (not illustrated in FIG. 12).

The acceptance section 53A accepts an instruction from the base station 6A. For example, the acceptance section 53A accepts an instruction to control the directivity of the antenna section 51 to be a second directivity which is narrower than the first directivity and carry out communication with the base station 6A via the antenna section 51.

The communication control section 54A controls communication with the base station 6A. For example, the communication control section 54A controls the antenna section 51 in accordance with the instruction accepted by the acceptance section 53A. For example, a case is assumed in which the instruction accepted by the acceptance section 53A is an instruction to control the directivity of the antenna section 51 to be a second directivity which is narrower than the first directivity and carry out communication with the base station 6A via the antenna section 51. In this case, the communication control section 54A controls the directivity of the antenna section 51 to be a second directivity which is narrower than the first directivity and carries out communication with the base station 6A via the antenna section 51.

(Configuration of Base Station 6A)

The base station 6A includes a control section 66, an antenna section 67, and a storage section 68.

The antenna section 67 is an antenna for carrying out wireless communication with the communication terminal 5A. The base station 6A carries out wireless communication with the communication terminal 5A via the antenna section 67.

The storage section 68 stores data which the control section 66 refers to. Examples of data stored in the storage section 68 include information acquired from the communication terminal 5A, information indicating a location of the base station 6A, and a radio wave map. Examples of the storage section 68 include, but not limited to, a flash memory, an HDD, an SSD, and a combination thereof.

(Control Section 66)

The control section 66 controls each constituent element included in the base station 6A. As illustrated in FIG. 12, the control section 66 includes an information acquisition section 61A, an instruction section 62A, a communication control section 63, an inference section 64, and an updating section 65. In the present example embodiment, the information acquisition section 61A, the instruction section 62A, the communication control section 63, and the updating section 65 are components for implementing the information acquisition means, the instruction means, the communication control means, and the updating means, respectively.

The information acquisition section 61A acquires information from the communication terminal 5A. For example, the information acquisition section 61A acquires, from the communication terminal 5A, information indicating the first directivity, the location of the communication terminal 5A, and the moving speed of the communication terminal 5A. The information acquisition section 61A acquires, from the communication terminal 5A, information indicating a location where the communication terminal 5A is currently present and current received power of the communication terminal 5A.

The instruction section 62A provides an instruction to the communication terminal 5A. For example, the instruction section 62A instructs the communication terminal 5A to carry out communication with the base station 6A via the antenna section 51 by controlling the directivity of the antenna section 51 to be a second directivity which is narrower than the first directivity. An example of a process which is carried out by the instruction section 62A will be described later.

Similarly to the communication control section 42 described above, the communication control section 63 controls communication with the communication terminal 5A. For example, the communication control section 63 decides a communication mode of communication between the communication terminal 5A and the base station 6A on the basis of (i) relative locations of the base station 6A and the communication terminal 5A based on the information acquired by the information acquisition section 61A and (ii) the moving speed of the communication terminal 5A. The communication mode is as described above.

Similarly to the inference section 34 described above, the inference section 64 infers a destination where the communication terminal 5A reaches after a predetermined time period. An example in which the inference section 64 infers a destination where the communication terminal 5A reaches after a predetermined time period is as described above.

Similarly to the updating section 43 described above, the updating section 65 updates the radio wave map stored in the storage section 68. As an example in which the updating section 65 updates the radio wave map, similarly to the example described above, the updating section 65 first acquires information which has been acquired by the information acquisition section 61A from the communication terminal 5A and which indicates a location and received power of the communication terminal 5A. Then, the updating section 65 updates the radio wave map on the basis of the information indicating the location and the received power the communication terminal 5A. With this configuration, the updating section 65 can create a radio wave map reflecting the radio wave status of the communication terminal 5A.

Example 1 of Process in which Instruction Section 62A Decides Second Directivity Examples of a process in which the instruction section 62A decides the second directivity include a process in which the instruction section 62A decides the second directivity using a learning model which has been trained to output the second directivity upon receipt of input of at least a first directivity, relative locations of the base station 6A and the communication terminal 5A, and a moving speed of the communication terminal 5A.

The learning model is generated by training using, as training data, communication statuses in the past. For example, the learning model is trained using, as training data, a set of a first directivity in the past, relative locations of the base station 6A and the communication terminal 5A in the past, a moving speed of the communication terminal 5A, and a second directivity. Examples of the learning model include a CNN.

Thus, the instruction section 62A can suitably decide the second directivity by deciding the second directivity using the learning model. In other words, the instruction section 62A can decide a suitable second directivity without deciding a second directivity by gradually broadening the directivity from the first directivity. Therefore, the instruction section 62A can shorten a time taken to set an antenna directivity of the communication terminal 5A to be suitable for communication.

Example 2 of Process in which Instruction Section 62A Decides Second Directivity Another example of the process in which the instruction section 62A decides the second directivity can be a process in which the instruction section 62A decides the second directivity on the basis of (i) a first directivity, (ii) relative locations of the base station 6A and the communication terminal 5A, (iii) a moving speed of the communication terminal 5A, and (iv) a radio wave map which is stored in the storage section 46 and which indicates radio wave statuses at respective places.

As an example of this configuration, a case is assumed in which the moving speed of the communication terminal 5A is 0 (in other words, the communication terminal 5A is not moving). In this case, the instruction section 62A acquires, from the radio wave map, a radio wave status in a region where the communication terminal 5A is located. Next, the instruction section 62A decides to employ, as the second directivity, a directivity which is narrower than the first directivity, which is narrowest, and with which communication with the base station 6A can be established in the radio wave status, on the basis of the radio wave status of the region where the communication terminal 5A is located.

As another example of this configuration, a case is assumed in which the moving speed of the communication terminal 5A is not 0 (in other words, the communication terminal 5A is moving). In this case, the instruction section 62A acquires information indicating a destination where the communication terminal 5A reaches after a predetermined time period, the destination having been inferred by the inference section 64. Next, the instruction section 62A acquires, from the radio wave map, a radio wave status of a region of the destination of the communication terminal 5A, the destination having been inferred by the inference section 64. Subsequently, the instruction section 62A refers to the radio wave map and decides to employ, as a second directivity after a predetermined time, a directivity which is narrower than the first directivity, which is narrowest, and with which communication with the base station 6A can be established in the radio wave status, on the basis of the radio wave status of the region of the destination of the communication terminal 5A, the destination having been inferred by the inference section 64.

Thus, the instruction section 62A can suitably decide the second directivity by deciding the second directivity based on the radio wave map. In other words, the instruction section 62A can decide a suitable second directivity without deciding a second directivity by gradually broadening the directivity from the first directivity. Therefore, the instruction section 62A can shorten a time taken to set an antenna directivity of the communication terminal 5A to be suitable for communication.

(Flow of Communication Control Method S210)

Figure 14:
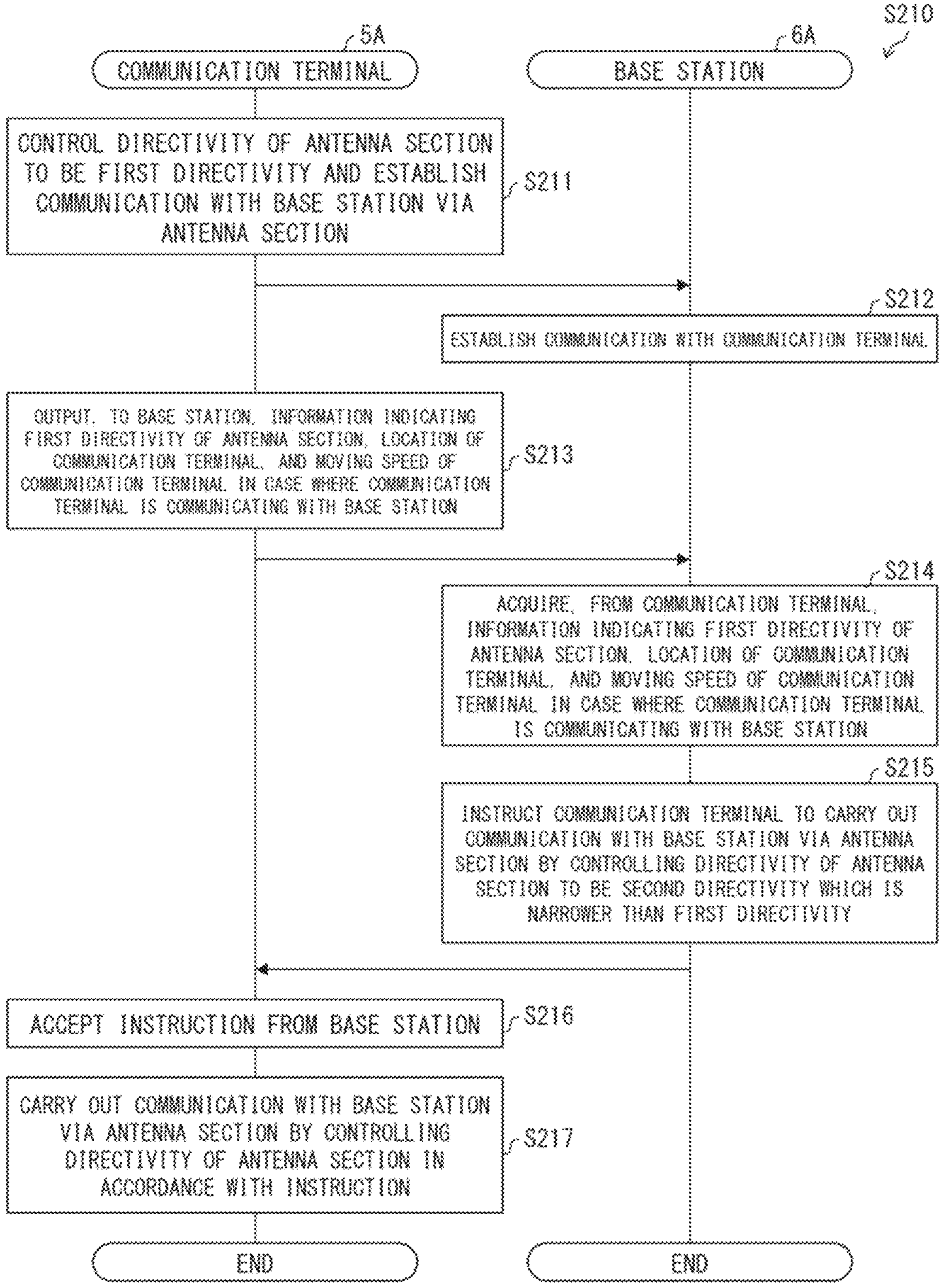
FIG. 14 is a flowchart illustrating a flow of a communication control method in accordance with the present disclosure.

The following description will discuss a flow of a communication control method S210 which is carried out in the communication system 210, with reference to FIG. 14. FIG. 14 is a flowchart illustrating the flow of the communication control method S210.

(Step S211)

In step S211, the communication control section 54A of the communication terminal 5A controls the directivity of the antenna section 51 to be a first directivity, and establishes communication with the base station 6A via the antenna section 51.

(Step S212)

In step S212, the communication control section 63 of the base station 6A establishes communication with the communication terminal 5A via the antenna section 67.

(Step S213)

In step S213, the information output section 52A of the communication terminal 5A outputs, to the base station 6A, information indicating a first directivity of the antenna section 51, a location of the communication terminal 5A, and a moving speed of the communication terminal 5A in a case where the communication terminal 5A is communicating with the base station 6A.

(Step S214)

In step S214, the information acquisition section 61A of the base station 6A acquires, from the communication terminal 5A, information indicating the first directivity of the antenna section 51, the location of the communication terminal 5A, and the moving speed of the communication terminal 5A in a case where the communication terminal 5A is communicating with the base station 6A.

(Step S215)

In step S215, the instruction section 62A instructs the communication terminal 5A to carry out communication with the base station 6A via the antenna section 51 by controlling the directivity of the antenna section 51 to be a second directivity which is narrower than the first directivity on the basis of (i) relative locations of the base station 6A and the communication terminal 5A based on the location of the communication terminal 5A and (ii) the moving speed of the communication terminal 5A.

(Step S216)

In step S216, the acceptance section 53A of the communication terminal 5A accepts an instruction from the base station 6A.

(Step S217)

In step S217, the communication control section 54A carries out communication with the base station 6A via the antenna section 51 by controlling the directivity of the antenna section 51 in accordance with the instruction accepted by the acceptance section 53A.

(Example Advantage of Communication System 210)

As described above, in the communication system 210 including the communication terminal 5A and the base station 6A, the base station 6A decides the second directivity on the basis of information which has been acquired from the communication terminal 5A and which indicates the first directivity, the location of the communication terminal 5A, and the moving speed of the communication terminal 5A.

Therefore, in the communication system 210, a suitable second directivity is decided without deciding a second directivity by gradually broadening the directivity from the first directivity. Therefore, the communication system 210 can bring about an example advantage of shortening a time taken to set an antenna directivity of the communication terminal 5A to be suitable for communication.

[Software Implementation Example]

The functions of part of or all of the communication terminals 1, 3, 3A, 5, and 5A and the base stations 2, 4, 4A, 6, and 6A (hereinafter referred to also as "each of the apparatuses") can be realized by hardware such as an integrated circuit (IC chip) or can be alternatively realized by software.

Figure 15:
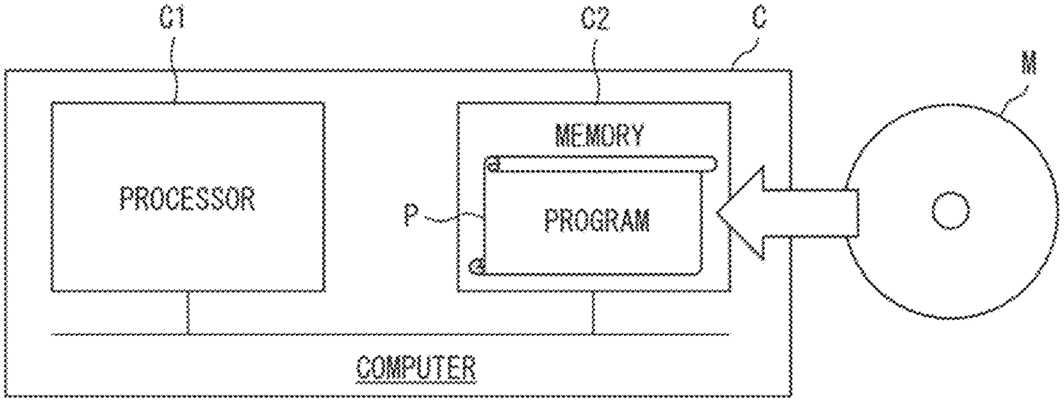
FIG. 15 is a block diagram illustrating a configuration of a computer which functions as each of the communication terminal and the base station in accordance with the present disclosure.

In the latter case, each of the apparatuses is implemented by, for example, a computer that executes instructions of a program that is software implementing the foregoing functions. FIG. 15 illustrates an example of such a computer (hereinafter, referred to as "computer C"). FIG. 15 is a block diagram illustrating a hardware configuration of the computer C which functions as each of the apparatuses.

The computer C includes at least one processor C1 and at least one memory C2. The memory C2 stores a program P for causing the computer C to operate as each of the apparatuses. The processor C1 of the computer C retrieves the program P from the memory C2 and executes the program P, so that the functions of each of the apparatuses are implemented.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a tensor processing unit (TPU), a quantum processor, a microcontroller, or a combination of these. Examples of the memory C2 include a flash memory, a hard disk drive (HDD), a solid state drive (SSD), and a combination thereof.

Note that the computer C can further include a random access memory (RAM) in which the program P is loaded when the program P is executed and in which various kinds of data are temporarily stored. The computer C can further include a communication interface for carrying out transmission and reception of data with other apparatuses. The computer C can further include an input-output interface for connecting input-output apparatuses such as a keyboard, a mouse, a display and a printer.

The program P can be stored in a computer C-readable, non-transitory, and tangible storage medium M. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communications network, a broadcast wave, or the like. The computer C can obtain the program P also via such a transmission medium.

[Additional Remark 1]

The present disclosure includes techniques described in supplementary notes below. Note, however, that the present invention is not limited to the techniques described in supplementary notes below, but may be altered in various ways by a skilled person within the scope of the claims.

(Supplementary Note 1)

A communication terminal including: an antenna section whose directivity is controllable; an information acquisition means for acquiring information indicating a location of a base station from the base station via the antenna section by controlling the directivity of the antenna section to be a first directivity; and a communication control means for carrying out communication with the base station via the antenna section by controlling the directivity of the antenna section to be a second directivity which is narrower than the first directivity, the communication control means deciding the second directivity on the basis of (i) relative locations of the base station and the communication terminal based on the information and (ii) a moving speed of the communication terminal.

(Supplementary Note 2)

The communication terminal according to supplementary note 1, in which: the communication control means decides the second directivity using a learning model which has been trained to output the second directivity upon receipt of input of at least the relative locations of the base station and the communication terminal and the moving speed of the communication terminal.

(Supplementary Note 3)

The communication terminal according to supplementary note 1, in which: the communication control means decides the second directivity on the basis of (i) the relative locations of the base station and the communication terminal, (ii) the moving speed of the communication terminal, and (iii) a radio wave map indicating radio wave statuses at respective places.

(Supplementary Note 4)

The communication terminal according to supplementary note 3, further including: an inference means for inferring a destination where the communication terminal reaches after a predetermined time period, the communication control means deciding the second directivity after the predetermined time period on the basis of a radio wave status at the destination which has been inferred by the inference means with reference to the radio wave map.

(Supplementary Note 5)

The communication terminal according to supplementary note 3 or 4, in which: in the radio wave map, a radio wave status of the communication terminal and radio wave statuses of one or more other communication terminals, which are different from the communication terminal, are reflected.

(Supplementary Note 6)

The communication terminal according to any one of supplementary notes 1 through 4, in which: the communication control means decides a communication mode of the communication on the basis of (i) the relative locations of the base station and the communication terminal and (ii) the moving speed of the communication terminal.

(Supplementary Note 7)

A base station including: an information acquisition means for acquiring information from a communication terminal that includes an antenna section whose directivity is controllable, the information indicating a first directivity of the antenna section, a location of the communication terminal, and a moving speed of the communication terminal in a case where the communication terminal is communicating with the base station; and an instruction means for instructing the communication terminal to carry out communication with the base station via the antenna section by controlling the directivity of the antenna section to be a second directivity which is narrower than the first directivity, the instruction means deciding the second directivity on the basis of (i) relative locations of the base station and the communication terminal based on the information and (ii) the moving speed of the communication terminal.

(Supplementary Note 8)

The base station according to supplementary note 7, in which: the instruction means decides the second directivity using a learning model which has been trained to output the second directivity upon receipt of input of at least the first directivity, the relative locations of the base station and the communication terminal, and the moving speed of the communication terminal.

(Supplementary Note 9)

The base station according to supplementary note 7, in which: the instruction means decides the second directivity on the basis of (i) the first directivity, (ii) the relative locations of the base station and the communication terminal, (iii) the moving speed of the communication terminal, and (iv) a radio wave map indicating radio wave statuses at respective places.

(Supplementary Note 10)

The base station according to any one of supplementary notes 7 through 9, further including: a communication control means for deciding a communication mode of the communication on the basis of (i) the relative locations of the base station and the communication terminal based on the information and (ii) the moving speed of the communication terminal.

(Supplementary Note 11)

The base station according to supplementary note 7 or 8, further including: an updating means for updating the radio wave map, the information acquisition means further acquiring, from the communication terminal, information indicating a location and received power of the communication terminal, and the updating means updating the radio wave map on the basis of the information indicating the location and the received power of the communication terminal.

(Supplementary Note 12)

A communication system including a communication terminal and a base station, the communication terminal including: an antenna section whose directivity is controllable; an information acquisition means for acquiring information indicating a location of the base station from the base station via the antenna section by controlling the directivity of the antenna section to be a first directivity; and a communication control means for carrying out communication with the base station via the antenna section by controlling the directivity of the antenna section to be a second directivity which is narrower than the first directivity, the communication control means deciding the second directivity on the basis of (i) relative locations of the base station and the communication terminal based on the information and (ii) a moving speed of the communication terminal, the base station including an information output means for outputting information indicating a location of the base station to the communication terminal.

(Supplementary Note 13)

A communication system including a communication terminal and a base station, the communication terminal including: an antenna section whose directivity is controllable; an information output means for outputting, to the base station, information indicating a first directivity of the antenna section, a location of the communication terminal, and a moving speed of the communication terminal in a case where the communication terminal is communicating with the base station; an acceptance means for accepting an instruction from the base station; and a communication control means for controlling the directivity of the antenna section in accordance with the instruction to carry out communication with the base station via the antenna section, the base station including: an information acquisition means for acquiring the information from the communication terminal; and an instruction means for instructing the communication terminal to carry out communication with the base station via the antenna section by controlling the directivity of the antenna section to be a second directivity which is narrower than the first directivity, the instruction means deciding the second directivity on the basis of (i) relative locations of the base station and the communication terminal based on the information and (ii) the moving speed of the communication terminal.

(Supplementary Note 14)

A method for controlling communication, the method including: acquiring, by a communication terminal including an antenna section whose directivity is controllable, information indicating a location of a base station from the base station via the antenna section by controlling the directivity of the antenna section to be a first directivity; and carrying out, by the communication terminal, communication with the base station via the antenna section by controlling the directivity of the antenna section to be a second directivity which is narrower than the first directivity, in the carrying out communication, the second directivity being decided on the basis of (i) relative locations of the base station and the communication terminal based on the information and (ii) a moving speed of the communication terminal.

(Supplementary Note 15)

A program for causing a computer to carry out: an information acquisition process of acquiring information indicating a location of a base station from the base station via an antenna section by controlling a directivity of the antenna section to be a first directivity; and a communication control process of carrying out communication with the base station via the antenna section by controlling the directivity of the antenna section to be a second directivity which is narrower than the directivity, first in the communication control process, the computer deciding the second directivity on the basis of (i) relative locations of the base station and the communication terminal based on the information and (ii) a moving speed of the communication terminal.

(Supplementary Note 16)

A method for controlling communication, the method including: acquiring, by a base station, information from a communication terminal that includes an antenna section whose directivity is controllable, the information indicating a first directivity of the antenna section, a location of the communication terminal, and a moving speed of the communication terminal in a case where the communication terminal is communicating with the base station; and instructing, by the base station, the communication terminal to carry out communication with the base station via the antenna section by controlling the directivity of the antenna section to be a second directivity which is narrower than the first directivity, in the instructing, the second directivity being decided on the basis of (i) relative locations of the base station and the communication terminal based on the information and (ii) the moving speed of the communication terminal.

(Supplementary Note 17)

A program for causing a computer to carry out: an information acquisition process of acquiring information from a communication terminal that includes an antenna section whose directivity is controllable, the information indicating a first directivity of the antenna section, a location of the communication terminal, and a moving speed of the communication terminal in a case where the communication terminal is communicating with a base station; and an instruction process of instructing the communication terminal to carry out communication with the base station via the antenna section by controlling the directivity of the antenna section to be a second directivity which is narrower than the first directivity, in the instruction process, the computer deciding the second directivity on the basis of (i) relative locations of the base station and the communication terminal based on the information and (ii) the moving speed of the communication terminal.

(Supplementary Note 18)

A communication control method carried out by a communication system including a communication terminal and a base station, the communication control method including: outputting, by the base station, information indicating a location of the base station to the communication terminal: acquiring, by the communication terminal including an antenna section whose directivity is controllable, information indicating the location of the base station from the base station via the antenna section by controlling the directivity of the antenna section to be a first directivity; and carrying out, by the communication terminal, communication with the base station via the antenna section by controlling the directivity of the antenna section to be a second directivity which is narrower than the first directivity, in the carrying out communication with the base station, the second directivity being decided on the basis of (i) relative locations of the base station and the communication terminal based on the information and (ii) a moving speed of the communication terminal.

(Supplementary Note 19)

A communication control method which is carried out by a communication system including a communication terminal and a base station, the communication control method including: outputting, to the base station, by the communication terminal including an antenna section whose directivity is controllable, information indicating a first directivity of the antenna section, a location of the communication terminal, and a moving speed of the communication terminal in a case where the communication terminal is communicating with the base station; acquiring, by the base station, the information from the communication terminal; instructing, by the base station, the communication terminal to carry out communication with the base station via the antenna section by controlling the directivity of the antenna section to be a second directivity which is narrower first accepting, by the than the directivity; communication terminal, the instruction from the base station; and carrying out, by the communication terminal, communication with the base station via the antenna section by controlling the directivity of the antenna section in accordance with the instruction, in the instructing, the second directivity being decided on the basis of (i) relative locations of the base station and the communication terminal based on the information and (ii) the moving speed of the communication terminal.

[Additional Remark 2]

The present disclosure includes techniques described in supplementary notes below. Note, however, that the present invention is not limited to the techniques described in supplementary notes below, but may be altered in various ways by a skilled person within the scope of the claims.

(Supplementary Note 1)

A communication terminal including an antenna section whose directivity is controllable and at least one processor, the at least one processor carrying out: an information acquisition process of acquiring information indicating a location of a base station from the base station via the antenna section by controlling the directivity of the antenna section to be a first directivity; and a communication control process of carrying out communication with the base station via the antenna section by controlling the directivity of the antenna section to be a second directivity which is narrower than the first directivity, in the communication control process, the at least one processor deciding the second directivity on the basis of (i) relative locations of the base station and the communication terminal based on the information and (ii) a moving speed of the communication terminal.

(Supplementary Note 2)

The communication terminal according to supplementary note 1, in which: in the communication control process, the at least one processor decides the second directivity using a learning model which has been trained to output the second directivity upon receipt of input of at least the relative locations of the base station and the communication terminal and the moving speed of the communication terminal.

(Supplementary Note 3)

The communication terminal according to supplementary note 1, in which: in the communication control process, the at least one processor decides the second directivity on the basis of (i) the relative locations of the base station and the communication terminal, (ii) the moving speed of the communication terminal, and (iii) a radio wave map indicating radio wave statuses at respective places.

(Supplementary Note 4)

The communication terminal according to supplementary note 3, in which: the at least one processor further carries out an inference process of inferring a destination where the communication terminal reaches after a predetermined time period; and in the communication control process, the at least one processor decides the second directivity after the predetermined time period with reference to the radio wave map and on the basis of a radio wave status at the destination which has been inferred in the inference process.

(Supplementary Note 5)

The communication terminal according to supplementary note 3 or 4, in which: in the radio wave map, a radio wave status of the communication terminal and radio wave statuses of one or more other communication terminals, which are different from the communication terminal, are reflected.

(Supplementary Note 6)

The communication terminal according to any one of supplementary notes 1 through 4, in which: in the communication control process, the at least one processor decides a communication mode of the communication on the basis of (i) the relative locations of the base station and the communication terminal and (ii) the moving speed of the communication terminal.

(Supplementary Note 7)

A base station including at least one processor, the at least one processor carrying out: an information acquisition process of acquiring information from a communication terminal that includes an antenna section whose directivity is controllable, the information indicating a first directivity of the antenna section, a location of the communication terminal, and a moving speed of the communication terminal in a case where the communication terminal is communicating with the base station; and an instruction process of instructing the communication terminal to carry out communication with the base station via the antenna section by controlling the directivity of the antenna section to be a second directivity which is narrower than the first directivity, in the instruction process, the at least one processor deciding the second directivity on the basis of (i) relative locations of the base station and the communication terminal based on the information and (ii) the moving speed of the communication terminal.

(Supplementary Note 8)

The base station according to supplementary note 7, in which: in the instruction process, the at least one processor decides the second directivity using a learning model which has been trained to output the second directivity upon receipt of input of at least the first directivity, the relative locations of the base station and the communication terminal, and the moving speed of the communication terminal.

(Supplementary Note 9)

The base station according to supplementary note 7, in which: in the instruction process, the at least one processor decides the second directivity on the basis of (i) the first directivity, (ii) the relative locations of the base station and the communication terminal, (iii) the moving speed of the communication terminal, and (iv) a radio wave map indicating radio wave statuses at respective places.

(Supplementary Note 10)

The base station according to any one of supplementary notes 7 through 9, in which: the at least one processor further carries out a communication control process of deciding a communication mode of the communication on the basis of (i) the relative locations of the base station and the communication terminal based on the information and (ii) the moving speed of the communication terminal.

(Supplementary Note 11)

The base station according to any one of supplementary notes 7 through 9, in which: the at least one processor further carries out an updating process of updating a radio wave map; in the information acquisition process, the at least one processor further acquires, from the communication terminal, information indicating a location and received power of the communication terminal; and in the updating process, the at least one processor updates the radio wave map on the basis of the information indicating the location and the received power of the communication terminal.

(Supplementary Note 12)

A communication system including a communication terminal and a base station, the communication terminal including an antenna section whose directivity is controllable and at least one processor, the at least one processor carrying out: an information acquisition process of acquiring information indicating a location of the base station from the base station via the antenna section by controlling the directivity of the antenna section to be a first directivity; and a communication control process of carrying out communication with the base station via the antenna section by controlling the directivity of the antenna section to be a second directivity which is narrower than the first directivity, in the communication control process, the at least one processor deciding the second directivity on the basis of (i) relative locations of the base station and the communication terminal based on the information and (ii) a moving speed of the communication terminal, and the base station including at least one processor, the at least one processor carrying out an information output process of outputting information indicating a location of the base station to the communication terminal.

(Supplementary Note 13)

A communication system including a communication terminal and a base station, the communication terminal including an antenna section whose directivity is controllable and at least one processor, the at least one processor carrying out; an information output process of outputting, to the base station, information indicating a first directivity of the antenna section, a location of the communication terminal, and a moving speed of the communication terminal in a case where the communication terminal is communicating with the base station; an acceptance process of accepting an instruction from the base station; and a communication control process of controlling the directivity of the antenna section in accordance with the instruction to carry out communication with the base station via the antenna section, the base station including at least one processor, the at least one processor carrying out: an information acquisition process of acquiring the information from the communication terminal; and an instruction process of instructing the communication terminal to carry out communication with the base station via the antenna section by controlling the directivity of the antenna section to be a second directivity which is narrower than the first directivity, in the instruction process, the at least one processor deciding the second directivity on the basis of (i) relative locations of the base station and the communication terminal based on the information and (ii) the moving speed of the communication terminal.

REFERENCE SIGNS LIST

1, 3, 3A, 5, 5A: Communication terminal
2, 4, 4A, 6, 6A: Base station
11, 31, 45, 51, 67: Antenna section
12, 21, 32, 32A, 61, 61A: Information acquisition section
22, 62, 62A: Instruction section
34, 64: Inference section
35, 43, 65: Updating section
36: Output section
37, 44, 57, 66: Control section
38, 46, 58, 68: Storage section
41, 41A, 52, 52A: Information output section
53, 53A: Acceptance section
100, 110, 200, 210: Communication system

The invention claimed is:

1. A communication terminal comprising an antenna section whose directivity is controllable and at least one processor, the at least one processor carrying out:

an information acquisition process of acquiring information indicating a location of a base station from the base station via the antenna section by controlling the directivity of the antenna section to be a first directivity; and a communication control process of carrying out communication with the base station via the antenna section by controlling the directivity of the antenna section to be a second directivity which is narrower than the first directivity, wherein in the communication control process, the at least one processor deciding the second directivity on the basis of (i) relative locations of the base station and said communication terminal based on the information, (ii) a moving speed of said communication terminal, and (iii) a radio wave map indicating radio wave statuses at respective places, and further wherein the at least one processor further carries out an inference process of inferring a destination where said communication terminal reaches after a predetermined time period; and in the communication control process, the at least one processor decides the second directivity after the predetermined time period with reference to the radio wave map and on the basis of a radio wave status at the destination which has been inferred in the inference process.

2. The communication terminal according to claim 1, wherein:

in the communication control process, the at least one processor decides the second directivity using a learning model which has been trained to output the second directivity upon receipt of input of at least the relative locations of the base station and said communication terminal and the moving speed of said communication terminal.

3. The communication terminal according to claim 1, wherein:

in the communication control process, the at least one processor decides a communication mode of the communication on the basis of (i) the relative locations of the base station and said communication terminal and (ii) the moving speed of said communication terminal.

4. A base station comprising at least one processor, the at least one processor carrying out:

an information acquisition process of acquiring information from a communication terminal that includes an antenna section whose directivity is controllable, the information indicating a first directivity of the antenna section, a location of the communication terminal, and a moving speed of the communication terminal in a case where the communication terminal is communicating with said base station; and an instruction process of instructing the communication terminal to carry out communication with said base station via the antenna section by controlling the directivity of the antenna section to be a second directivity which is narrower than the first directivity, in the instruction process, the at least one processor deciding the second directivity on the basis of (i) relative locations of the base station and the communication terminal based on the, (ii) a moving speed of said communication terminal, and (iii) a radio wave map indicating radio wave statuses at respective places, and wherein the at least one processor further carries out an inference process of inferring a destination where said communication terminal reaches after a predetermined time period; and in the communication control process, the at least one processor decides the second directivity after the predetermined time period with reference to the radio wave map and on the basis of a radio wave status at the destination which has been inferred in the inference process.

5. The base station according to claim 4, wherein:

in the instruction process, the at least one processor decides the second directivity using a learning model which has been trained to output the second directivity upon receipt of input of at least the first directivity, the relative locations of said base station and the communication terminal, and the moving speed of the communication terminal.

6. The base station according to claim 4, wherein:

in the instruction process, the at least one processor decides the second directivity on the basis of (i) the first directivity, (ii) the relative locations of said base station and the communication terminal, (iii) the moving speed of the communication terminal, and (iv) a radio wave map indicating radio wave statuses at respective places.

7. The base station according to claim 4, wherein:

the at least one processor further carries out a communication control process of deciding a communication mode of the communication on the basis of (i) the relative locations of said base station and the communication terminal based on the information and (ii) the moving speed of the communication terminal.

8. The base station according to claim 4, wherein:

the at least one processor further carries out an updating process of updating a radio wave map;

in the information acquisition process, the at least one processor further acquires, from the communication terminal, information indicating a location and received power of the communication terminal; and in the updating process, the at least one processor updates the radio wave map on the basis of the information indicating the location and the received power of the communication terminal.

9. A method for controlling communication, said method comprising:

acquiring, by a communication terminal including an antenna section whose directivity is controllable, information indicating a location of a base station from the base station via the antenna section by controlling the directivity of the antenna section to be a first directivity; and carrying out, by the communication terminal, communication with the base station via the antenna section by controlling the directivity of the antenna section to be a second directivity which is narrower than the first directivity, in the carrying out communication, the second directivity being decided on the basis of (i) relative locations of the base station and the communication terminal based on the information, (ii) a moving speed of the communication terminal, and (iii) a radio wave map indicating radio wave statuses at respective places, and inferring a destination where the communication terminal reaches after a predetermined time period, and in the carrying out communication, the second directivity after the predetermined time period being decided with reference to the radio wave map and on the basis of a radio wave status at the destination which has been inferred in the inferring.

10. The method according to claim 9, wherein:

in the radio wave map, a radio wave status of the communication terminal and radio wave statuses of one or more other communication terminals, which are different from the communication terminal, are reflected.

11. The method according to claim 9, wherein:

in the carrying out communication, a communication mode of the communication is decided on the basis of (i) the relative locations of the base station and the communication terminal and (ii) the moving speed of the communication terminal.

* * * * *